(12) United States Patent
Tan Bergström et al.

(10) Patent No.: US 10,517,132 B2
(45) Date of Patent: Dec. 24, 2019

(54) TERMINAL DEVICES, NETWORK NODES AND METHODS OF OPERATING THE SAME

(71) Applicant: Telefonaktiebolaget LM Ericsson (Publ), Stockholm (SE)

(72) Inventors: Mattias Tan Bergström, Stockholm (SE); Torsten Dudda, Aachen (DE); Helka-Liina Määttanen, Helsinki (FI)

(73) Assignee: Telefonaktiebolaget LM Ericsson (Publ) (SE)

( * ) Notice: Subject to any disclaimer, the term of this patent is extended or adjusted under 35 U.S.C. 154(b) by 386 days.

(21) Appl. No.: 15/117,659

(22) PCT Filed: Jun. 14, 2016

(86) PCT No.: PCT/SE2016/050571
§ 371 (c)(1),
(2) Date: Aug. 9, 2016

(87) PCT Pub. No.: WO2017/014686
PCT Pub. Date: Jan. 26, 2017

(65) Prior Publication Data
US 2017/0164221 A1    Jun. 8, 2017

Related U.S. Application Data

(60) Provisional application No. 62/193,780, filed on Jul. 17, 2015.

(51) Int. Cl.
*H04W 8/02* (2009.01)
*H04W 76/18* (2018.01)
(Continued)

(52) U.S. Cl.
CPC ......... *H04W 76/18* (2018.02); *H04L 41/0668* (2013.01); *H04W 8/02* (2013.01);
(Continued)

(58) Field of Classification Search
CPC ....... H04W 76/18; H04W 76/30; H04W 8/02; H04W 24/02; H04W 24/04; H04W 48/18;
(Continued)

(56) References Cited

U.S. PATENT DOCUMENTS 8,693,400 B2 * 4/2014 Nishida ................. H04W 24/04
370/328
9,456,461 B2 * 9/2016 Wu .......................... H04W 8/26
(Continued)

FOREIGN PATENT DOCUMENTS

EP    2 117 269 A1    11/2009
GB    2512347 A       10/2014

OTHER PUBLICATIONS

International Search Report and Written Opinion dated Aug. 30, 2016 for International Application Serial No. PCT/SE2016/050571, International Filing Date: Jun. 14, 2016 consisting of 18-pages.
(Continued)

*Primary Examiner* — Kevin D Mew
(74) *Attorney, Agent, or Firm* — Christopher & Weisberg, P.A.

(57) ABSTRACT

According to an exemplary embodiment, there is provided a method of operating a terminal device, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, the method comprising on occurrence of a failure condition with respect to a connection to one or more network nodes operating according to the second RAT having an identifier in the mobility set, sending a failure indication message to
(Continued)

111 — Receive a failure indication message from a terminal device, the failure indication message indicating the occurrence of a failure condition with respect to a connection to one or more network nodes operating according to a second RAT and that have an identifier in a mobility set in the terminal device the first network to signal the occurrence of the failure condition to the first network.

20 Claims, 10 Drawing Sheets

(51) Int. Cl.
| | | |
|---|---|---|
| *H04L 12/24* | (2006.01) | |
| *H04W 24/04* | (2009.01) | |
| *H04W 48/18* | (2009.01) | |
| H04W 76/30 | (2018.01) | |
| H04W 24/02 | (2009.01) | |
| H04W 36/00 | (2009.01) | |
| H04W 84/12 | (2009.01) | |

(52) U.S. Cl.
CPC ........... *H04W 24/04* (2013.01); *H04W 48/18* (2013.01); *H04W 24/02* (2013.01); *H04W 36/0069* (2018.08); *H04W 76/30* (2018.02); *H04W 84/12* (2013.01)

(58) Field of Classification Search
CPC .............. H04W 36/0069; H04W 84/12; H04L 41/0668
See application file for complete search history.

(56) References Cited

U.S. PATENT DOCUMENTS

| | | | | |
|---|---|---|---|---|
| 9,838,945 | B2* | 12/2017 | Wu | H04W 40/14 |
| 9,907,110 | B2* | 2/2018 | Susitaival | H04W 76/18 |
| 10,051,532 | B2* | 8/2018 | Kordybach | H04W 24/04 |
| 2006/0088009 | A1 | 4/2006 | Gibbs et al. | |
| 2009/0290498 | A1* | 11/2009 | Bajpay | H04L 41/064 370/242 |
| 2010/0195507 | A1* | 8/2010 | Marinier | H04L 1/20 370/242 |
| 2010/0240359 | A1* | 9/2010 | Wu | H04W 24/00 455/424 |
| 2011/0320588 | A1 | 12/2011 | Raleigh | |
| 2013/0165108 | A1* | 6/2013 | Xu | H04W 24/04 455/423 |
| 2013/0188474 | A1* | 7/2013 | Chen | H04W 24/04 370/218 |
| 2013/0316699 | A1* | 11/2013 | Jheng | H04W 48/18 455/423 |
| 2014/0051429 | A1* | 2/2014 | Jung | H04W 24/08 455/422.1 |
| 2014/0079022 | A1* | 3/2014 | Wang | H04W 36/22 370/331 |
| 2014/0082142 | A1* | 3/2014 | Geffin | G06F 13/385 709/217 |
| 2014/0112155 | A1 | 4/2014 | Lindoff et al. | |
| 2014/0161103 | A1 | 6/2014 | Sirotkin et al. | |
| 2015/0098448 | A1* | 4/2015 | Xu | H04W 24/10 370/331 |
| 2015/0103758 | A1* | 4/2015 | Wang | H04W 72/0426 370/329 |
| 2016/0205578 | A1* | 7/2016 | Lee | H04W 24/10 455/442 |
| 2016/0249282 | A1* | 8/2016 | Zhou | H04M 15/66 |
| 2017/0164221 | A1* | 6/2017 | Tan Bergstrom | H04W 76/18 |
| 2017/0303145 | A1* | 10/2017 | Yang | H04W 24/02 |
| 2018/0131771 | A9* | 5/2018 | Kim | H04L 67/141 |

OTHER PUBLICATIONS

3GPP TSG-RAN WG2 #90, Tdoc R2-152563, Fukuoka, Japan, Title: "WLAN Reliability with LTE+WLAN Aggregation in LTE R13", Source: InterDigital Communications, Agenda Item: 7.6.2.1, Document for Discussion, Decision, May 25-29, 2015 consisting of 3-pages.

3GPP TS 23.402 V13.2.0 (Jun. 2015) 3rd Generation Partnership Project; Technical Specification Group Services and System Aspects; Architecture Enhancements for Non-3GPP Accesses (Release 13) Jun. 21, 2015 consisting of 292-pages.

3GPP TSG-RAN WG2 #91, Tdoc R2-153645, Beijing, China, Title: "Connection Failure Report", Source: Ericsson, Agenda Item: 7.63, Document for Discussion, Decision, Aug. 24-28, 2015 consisting of 4-pages.

3GPP TSG RAN Meeting #67, RP-150510, Shanghai, China, revision of RP-yynnnn, Title: "New WI Proposal: LTE-WLAN Radio Level Integration and Interworking Enhancement," Source: Intel Corporation, China Telecom, Qualcomm Incorporated, Agenda Item: 13.1.2, Document for: Approval, Mar. 9-12, 2015 consisting of 9-pages.

3GPP TS 23.401 V12.8.0 (Mar. 2015) 3rd Generation Partnership Project; Technical Specification Group Services and System Aspects; General Packet Radio Service (GPRS) enhancements for Evolved Universal Terrestrial Radio Access Network (E-UTRAN) Access (Release 12) Mar. 19, 2015 consisting of 308-pages.

3GPP TSG-RAN WG2 Meeting #89bis, R2-151270, Bratislava, Slovakia, Title: "LTE-WLAN Radio Interworking Improvements," WID/SID: LTE_WLAN_Radio-Core—Release 13, Agenda item: 7.6.4, Source: Nokia Networks, Document for: Discussion and Decision, Apr. 20-24, 2015 consisting of 4-pages.

3GPP TSG-RAN WG2 Meeting #90, R2-152109, Fukuoka, Japan, Title: "Traffic Steering Command for Rel-13 WLAN Interworking," Source: Nokia Networks, WID/SID: LTE_WLAN_Radio_Core—Release 13, Document for Discussion and Decision, May 25-29, 2015 consisting of 3-pages.

3GPP TSG-RAN WG2 Meeting #90, R2-152654, Fukuoka, Japan, Title: AP Selection for LTE-WLAN Aggregation, Source: Huawei, HiSilicon, Agenda Item: 7.6.2.1., Document for Discussion and Decision, May 25-29, 2015 consisting of 2-pages.

3GPP TSG-RAN WG2 Meeting #90, R2-152738, Fukuoka, Japan, Title: "Control Plane Architecture for LTE-WLAN Aggregation," Source: Qualcomm Incorporated, KT Corp., CMCC, Intel Corporation, KDDI, China Telecom, Agenda Item: 7.6.2.1, Document for Discussion and Decision, May 25-29, 2015 consisting of 5-pages.

3GPP TSG RAN Meeting #68, RP-151114, revision of RP-150510, Malmö, Sweden, Title: Revised WID: "LTE-WLAN Radio Level Integration and Interworking Enhancement," Agenda Item: 11.3.12, Source: Intel Corporation, Document for: Approval, Jun. 15-18, 2015 consisting of 10-pages.

3GPP TS 36.331 V12.6.0 (Jun. 2015) 3rd Generation Partnership Project; Technical Specification Group Radio Access Evolved Universal Terrestrial Radio Access (E-UTRA); Radio Resource Control (RRC); Protocol Specification (Release 12) Jul. 8, 2015 consisting of 449-pages.

\* cited by examiner

101 — Send a failure indication message to a first network to signal the occurrence of a failure condition with respect to a connection to one or more network nodes operating according to a second RAT having an identifier in a mobility set

Figure 5

111 — Receive a failure indication message from a terminal device, the failure indication message indicating the occurrence of a failure condition with respect to a connection to one or more network nodes operating according to a second RAT and that have an identifier in a mobility set in the terminal device

Figure 6

TERMINAL DEVICES, NETWORK NODES AND METHODS OF OPERATING THE SAME

CROSS-REFERENCE TO RELATED APPLICATIONS

This application is a Submission Under 35 U.S.C. § 371 for U.S. National Stage Patent Application of International Application Number: PCT/SE2016/050571, filed Jun. 14, 2016 entitled "TERMINAL DEVICES, NETWORK NODES AND METHODS OF OPERATING THE SAME," which claims priority to U.S. Provisional Application Ser. No. 62/193,780, filed Jul. 17, 2015, the entirety of both which are incorporated herein by reference.

TECHNICAL FIELD

This disclosure relates to terminal devices and network nodes in a communication network and methods of operating the same.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications").

The IEEE 802.11 specifications regulate the functions and operations of the Wi-Fi access points (APs) or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Network operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks.

In particular, cellular network operators are seeking ways to offload traffic from their cellular networks to Wi-Fi, e.g. in peak-traffic-hours and in situations when the cellular network for one reason or another needs to be off-loaded, e.g. to provide requested quality of service, maximise bandwidth or simply for coverage.

Portable wireless devices or terminal devices (also referred to in 3GPP as user equipments—UEs) today usually support both Wi-Fi and a number of 3GPP cellular technologies, but many of the terminal devices are effectively behaving as two separate devices from a radio access perspective. The 3GPP radio access network (RAN) and the modems and protocols that are operating pursuant to the 3GPP specifications are basically unaware of the wireless access Wi-Fi protocols and modems that are operating pursuant to the 802.11 specifications.

Techniques for access network selection (i.e. the selection of which type of network, e.g. 3GPP or WLAN, a UE should access or connect to) and traffic steering (i.e. the selection of a network to be used for a particular data flow) are being discussed and agreed in 3GPP. In Release-12, LTE/WLAN interworking has been standardized so that among others the eNB can provide the UE with "RAN rules", i.e. thresholds, which the UE evaluates and based on that steers traffic between LTE and WLAN. The thresholds values could be, for example, for metrics such as 3GPP signal-related metrics Reference Signal Received Power (RSRP)/Reference Signal Received Quality (RSRQ)/Received Signal Code Power (RSCP)/EcNo, WLAN signal-related metrics such as Received Channel Power Indicator (RCPI)/Received Signal Strength Indicator (RSSI), WLAN load/utilization, WLAN backhaul load/capacity, etc. Furthermore, it is decided in the mobility management entity (MME) which traffic is off-loadable/steerable, e.g. voice-over-Internet protocol (VOIP) traffic may stay in LTE while other traffic is off-loadable. This happens on packet data network (PDN) connection level. Additionally, in Release 13 it is envisaged that the UE provides the eNB with WLAN measurements, that the eNB can consider when providing the UE with RAN rules. Furthermore, it is discussed that the eNB can provide the UE with a dedicated traffic steering command to move traffic between LTE and WLAN.

Another way in which cellular network operators intend to use Wi-Fi is to use aggregation. 3GPP/WLAN aggregation is a feature whereby a UE may at least receive (and possibly also transmit) data using links to both the 3GPP network and a WLAN. This is similar in principle to dual connectivity within LTE, but it aggregates carriers from different radio access technologies (RATs), e.g. a 3GPP network and Wi-Fi. 3GPP/WLAN aggregation is currently being standardized by 3GPP in Release 13 as part of "LTE-WLAN Radio Level Integration and Interworking Enhancement", RP-150510 which was submitted to 3GPP TSG RAN Meeting #67 in Shanghai, China on 9-12 Mar. 2015.

In a split bearer architecture option for LTE/WLAN aggregation in the downlink, data is split on a packet data convergence protocol (PDCP) layer in the eNB (which is a term used to describe a radio base station in LTE). The eNB may route PDCP packet data units (PDUs) dynamically via eNB radio link control (RLC) to the UE directly, or via a backhaul channel to WLAN and then to the UE. In a separate bearer architecture option, the lower layers of a bearer are switched to LTE or WLAN meaning all PDCP packets of that bearer are routed via either LTE or the WLAN side.

FIG. 1 shows an exemplary protocol architecture for LTE/WLAN aggregation and illustrates a protocol architecture for the eNB 2, a "WLAN termination point" 4 and a UE 6. Other protocol architectures are also being considered. The WLAN termination point 4 in the network is denoted WLAN termination (WT) and may be implemented by a WLAN access point (AP) and/or access controller (AC) or another network node. The interface protocol between eNB 2 and WT 4 is denoted Xw and is used to exchange control plane and user plane information between the eNB 2 and WT 4.

For mobility, it is envisaged that the eNB or other network node in the 3GPP network is in control of which WLANs a UE should consider for access network selection, traffic steering and/or traffic aggregation. However, the UE is in control of which node is actually used for aggregation and/or which network is selected for access and which network node traffic is steered to. Thus, an eNB or other network node can provide the UE with a set of WLANs or WLAN nodes that the UE can consider when deciding which node to use for aggregation, access network selection or traffic steering. In some cases the decision on where the UE steers traffic to, which particular network is accessed or which node is used for aggregation may be transparent to the eNB. This set, or a similar set, may also be used when performing access network selection or traffic steering. The set may be provided in the form of a set of identifiers for the WLANs or WLAN nodes, which may be Service Set Identifiers (SSIDs), Extended SSIDs (ESSIDs), Homogeneous ESSIDs (HESSIDs), Basic SSIDs (BSSIDs), or a realm identifier. This set is referred to herein as a mobility list or a mobility set.

SUMMARY

As noted above, the mobility of a UE is transparent to the eNB and other nodes in the cellular network, which means that the eNB or other node is not in direct control of which WLAN or WLAN node the UE uses for access network selection, traffic steering or traffic aggregation. This lack of visibility of the operation of the UE is problematic for the eNB and cellular network as a whole, particularly where a connection between the UE and the WLAN fails or cannot be established.

Thus, the techniques described herein provide a solution for efficiently handling messages in respect of connection failures (e.g. to a WLAN) for a UE that also has a connection to a cellular network. E.g. in the context of LTE and WLAN, if the WLAN connection or attempt to connect to the WLAN fails, a failure indication can be sent via LTE to the LTE network. These techniques concern in particular failures in respect of connections to nodes (e.g. WLAN nodes) having an identifier in a mobility set of the UE. The described techniques set out when a failure indication can be sent, and the information that can be included. Furthermore, the described techniques set out actions that can be taken by the cellular network on receiving such a failure indication.

According to a first aspect, there is provided a method of operating a terminal device, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation. The method comprises on occurrence of a failure condition with respect to a connection to one or more network nodes operating according to the second RAT having an identifier in the mobility set, sending a failure indication message to the first network to signal the occurrence of the failure condition to the first network; wherein the failure condition comprises: the terminal device failing to connect to all of the network nodes that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a second aspect, there is provided a terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation. The terminal device is configured to on occurrence of a failure condition with respect to a connection to one or more network nodes operating according to the second RAT having an identifier in the mobility set, send a failure indication message to the first network to signal the occurrence of the failure condition to the first network; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a third aspect, there is provided a method of operating a network node in a first network that is operating according to a first radio access technology, RAT. The method comprises receiving a failure indication message from a terminal device, the failure indication message indicating the occurrence of a failure condition with respect to a connection to one or more network nodes operating according to a second RAT and that have an identifier in a mobility set in the terminal device; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a fourth aspect, there is provided a network node for use in a first network that is operating according to a first radio access technology, RAT. The network node is configured to receive a failure indication message from a terminal device (42), the failure indication message indicating the occurrence of a failure condition with respect to a connection to one or more network nodes (44) operating according to a second RAT and that have an identifier in a mobility set in the terminal device; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a fifth aspect, there is provided a computer program product comprising a computer readable medium having computer readable code embodied therein, the computer readable code being configured such that, on execution by a suitable computer or processor, the computer or processor is caused to perform any of the methods described above.

According to a sixth aspect, there is provided a terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation. The terminal device comprises a processor and a memory, said memory containing instructions executable by said processor whereby said terminal device is operative to: on occurrence of a failure condition with respect to a connection to one or more network nodes operating according to the second RAT having an identifier in the mobility set, send a failure indication message to the first network to signal the occurrence of the failure condition to the first network; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a seventh aspect, there is provided a network node for use in a first network that is operating according to a first radio access technology, RAT. The network node comprises a processor and a memory, said memory containing instructions executable by said processor whereby said network node is operative to: receive a failure indication message from a terminal device, the failure indication message indicating the occurrence of a failure condition with respect to a connection to one or more network nodes operating according to a second RAT and that have an identifier in a mobility set in the terminal device; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to an eighth aspect, there is provided a terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation. The terminal device comprises: a sending module configured to, on occurrence of a failure condition with respect to a connection to one or more network nodes operating according to the second RAT having an identifier in the mobility set, send a failure indication message to the first network to signal the occurrence of the failure condition to the first network; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

According to a ninth aspect, there is provided a network node for use in a first network that is operating according to a first radio access technology, RAT. The network node comprises: a receiving module configured to receive a failure indication message from a terminal device, the failure indication message indicating the occurrence of a failure condition with respect to a connection to one or more network nodes operating according to a second RAT and that have an identifier in a mobility set in the terminal device; wherein the failure condition comprises: the terminal device failing to connect to all of the network nodes operating according to the second RAT that have an identifier in the mobility set; the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

Exemplary embodiments and techniques are set out in the following statements and paragraphs.

A method of operating a terminal device is provided, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, the method comprising, on occurrence of a failure condition with respect to a connection to one or more network nodes operating according to the second RAT having an identifier in the mobility set, sending a failure indication message to the first network to signal the occurrence of the failure condition to the first network.

The method may further comprise the step of preventing the sending of the failure indication message to the first network if the terminal device connects to a network node operating according to the second RAT having an identifier in the mobility set.

The method may further comprise the step of receiving the mobility set from the first network or a network node operating according to the second RAT.

Alternatively, the method may further comprise the step of obtaining the mobility set from an access network discovery and selection function, ANDSF, policy.

A terminal device is also provided, wherein the terminal device is for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, and wherein the terminal device is configured to, on occurrence of a failure condition with respect to a connection to one or more network nodes operating according to the second RAT having an identifier in the mobility set, send a failure indication message to the first network to signal the occurrence of the failure condition to the first network.

The terminal device may be further configured to prevent the sending of the failure indication message to the first network if the terminal device connects to a network node operating according to the second RAT having an identifier in the mobility set.

The terminal device may be further configured to receive the mobility set from the first network or a network node operating according to the second RAT.

Alternatively, the terminal device may be further configured to obtain the mobility set from an access network discovery and selection function, ANDSF, policy.

Also provided is a method of operating a network node in a first network that is operating according to a first radio access technology, RAT, in which the method comprises receiving a failure indication message from a terminal device, the failure indication message indicating the occurrence of a failure condition with respect to a connection to one or more network nodes operating according to a second RAT and that have an identifier in a mobility set in the terminal device.

The method can further comprise the step of sending the mobility set to the terminal device.

The method can further comprise the step of the network node in the first network performing one or more actions in response to the received failure indication message.

The one or more actions can comprise any of the following:
 adding one or more identifiers for network nodes operating according to the second RAT to the mobility set in the terminal device.
 removing one or more identifiers for network nodes operating according to the second RAT from the mobility set in the terminal device.
 configuring the terminal device to stop attempting to perform access network selection, traffic steering and/or traffic aggregation.
 collecting statistics on the performance of the second network.
 reconfiguring one or more network nodes in the second network.

Also provided is a network node for use in a first network that is operating according to a first radio access technology, RAT, wherein the network node is configured to receive a failure indication message from a terminal device, the failure indication message indicating the occurrence of a failure condition with respect to a connection to one or more network nodes operating according to a second RAT and that have an identifier in a mobility set in the terminal device.

The network node can be further configured to send the mobility set to the terminal device.

The network node can be further configured to perform one or more actions in response to the received failure indication message.

The one or more actions can comprise any of the following:
 adding one or more identifiers for network nodes operating according to the second RAT to the mobility set in the terminal device.
 removing one or more identifiers for network nodes operating according to the second RAT from the mobility set in the terminal device.
 configuring the terminal device to stop attempting to perform access network selection, traffic steering and/or traffic aggregation.
 collecting statistics on the performance of the second network.
 reconfiguring one or more network nodes operating according to the second RAT.

The following statements can be applied to any of the above statements and relate to either of the terminal device and the network node in the first network.

A failure indication message can be sent/received for each failure condition that occurs.

The failure indication message can indicate the network node or network nodes operating according to the second RAT having an identifier in the mobility set for which the failure condition occurred.

The failure indication message can indicate the identifiers in the mobility set associated with the network node or network nodes operating according to the second RAT for which the failure condition occurred.

The failure indication message can also indicate one or more additional identifiers that are associated with the network node or network nodes operating according to the second RAT for which the failure condition occurred, wherein the one or more additional identifiers are not contained in the mobility set.

The failure indication message can indicate the particular failure condition that occurred or a reason for the failure condition.

Where the failure indication message is sent/received in respect of a failure condition that has occurred for a plurality of network nodes operating according to the second RAT having identifiers in the mobility set, the failure indication message can indicate a respective reason for the failure condition for each of the plurality of network nodes.

Where the failure indication message is sent/received in respect of a failure condition that has occurred for one or more network nodes operating according to the second RAT having identifiers in the mobility set, the failure indication message can indicate a respective reason for the failure condition for each of the identifiers in the mobility set associated with the one or more network nodes operating according to the second RAT for which the failure condition occurred.

Where the failure indication message is sent/received in respect of a failure condition that has occurred for a plurality of network nodes operating according to the second RAT having identifiers in the mobility set, the failure indication message can indicate a single reason for the failure condition.

Possible failure conditions are set out below. These failure conditions also correspond to possible reasons for a failure condition that can be indicated in the failure indication message.
 the terminal device failing to connect to a network node operating according to the second RAT having an identifier in the mobility set.
 the terminal device failing to detect a network node operating according to the second RAT having an identifier in the mobility set.
 the terminal device failing to connect to a network node operating according to the second RAT having an identifier in the mobility set that has been detected by the terminal device.
 the terminal device failing to connect to all or a subset of the network nodes operating according to the second RAT that have an identifier in the mobility set.
 the terminal device failing to detect all or a subset of the network nodes operating according to the second RAT that have an identifier in the mobility set.
 the terminal device failing to connect to all or a subset of the network nodes operating according to the second RAT that have an identifier in the mobility set and that have been detected by the terminal device.

the terminal device failing to connect to all or a subset of the network nodes operating according to the second RAT that have an identifier in the mobility set during a predetermined time period.

the terminal device failing to detect all or a subset of the network nodes operating according to the second RAT that have an identifier in the mobility set during a predetermined time period.

the terminal device failing to connect to all or a subset of the network nodes operating according to the second RAT that have an identifier in the mobility set and that have been detected by the terminal device during a predetermined time period.

a user preference indicating that the terminal device is not to connect to any network nodes operating according to the second RAT having an identifier in the mobility set.

the terminal device being connected to a network node operating according to the second RAT that does not have an identifier in the mobility set.

communication circuitry in the terminal device for use in communicating with network nodes operating according to the second RAT being deactivated or disabled.

the terminal device failing to steer traffic from the first network to a network node operating according to the second RAT.

the terminal device failing to aggregate traffic through a network node in the first network and a network node operating according to the second RAT.

the failure of a connection, flow or bearer to a network node operating according to the second RAT.

a signal quality or signal strength of a connection to a network node operating according to the second RAT having an identifier in the mobility set being below a threshold value.

Where the failure condition/reason for the failure condition relates to a subset of the network nodes operating according to the second RAT that have an identifier in the mobility set, the subset can comprise a predetermined percentage of the total number of network nodes having an identifier in the mobility set.

Alternatively, where the failure condition/reason for the failure condition relates to a subset of the network nodes operating according to the second RAT that have an identifier in the mobility set, the subset can comprise a predetermined number of network nodes having an identifier in the mobility set.

Where in the above failure conditions and reasons for failure conditions the terminal device fails to connect to a network node operating according to the second RAT, failing to connect can comprise any one or more of the following reasons (and these specific reasons can be indicated in the failure indication message if required):

rejection of a connection request from the terminal device to a network node operating according to the second RAT.

disconnection of a connection between the terminal device and a network node operating according to the second RAT that has an identifier in the mobility set.

the terminal device failing to detect a network node operating according to the second RAT that has an identifier in the mobility set.

the terminal device failing to obtain a network address, for example an Internet Protocol, IP, address, from a network node operating according to the second RAT.

the terminal device failing to be authenticated by a network node operating according to the second RAT that has an identifier in the mobility set.

failing to establish a connection between the terminal device and a network node operating according to the second RAT within a predetermined time period.

The terminal device can send the failure indication message to the first network as part of a radio resource control, RRC, message.

The terminal device can send the failure indication message to the first network as part of a secondary cell group, SCG, failure information message.

The first RAT can be a RAT that has been standardised by 3GPP.

The second RAT can be W-Fi or a wireless local area network, WLAN.

Each identifier in the mobility set can be a service set identifier, SSID, an extended SSID, ESSID, a homogenous ESSID, HESSID, a basic SSID, BSSID or a realm.

Computer program products comprising a computer readable medium having computer readable code embodied therein are also contemplated, the computer readable code being configured such that, on execution by a suitable computer or processor, the computer or processor is caused to perform any of the methods described above.

BRIEF DESCRIPTION OF THE DRAWINGS

Features, objects and advantages of the presently disclosed techniques will become apparent to those skilled in the art by reading the following detailed description where references will be made to the appended figures in which:

FIG. 5 is a flow chart illustrating a method of operating a terminal device;

FIG. 6 is a flow chart illustrating a method of operating a network node;

DETAILED DESCRIPTION

Figure 1:
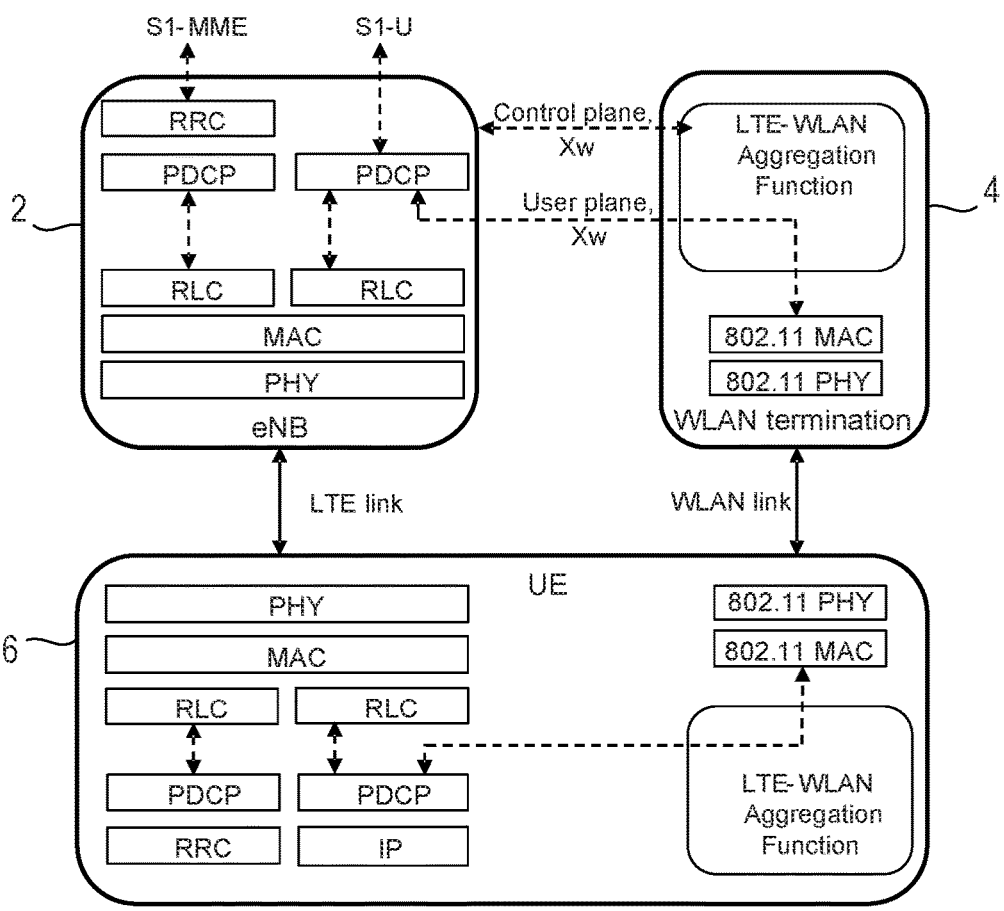
FIG. 1 illustrates an exemplary protocol architecture for LTE/WLAN aggregation.

The following sets forth specific details, such as particular embodiments for purposes of explanation and not limitation.

But it will be appreciated by one skilled in the art that other embodiments may be employed apart from these specific details. In some instances, detailed descriptions of well known methods, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the terms "mobile device" and "terminal device" encompass any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink and/or receiving radio signals in the uplink. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a WLAN AP, a network node in the RAN responsible for resource management, such as a radio network controller (RNC), or, in some cases, a core network node, such as a mobility management entity (MME).

Unless otherwise indicated herein, the signalling described is either via direct links or logical links (e.g. via higher layer protocols and/or via one or more network nodes).

Figure 2:
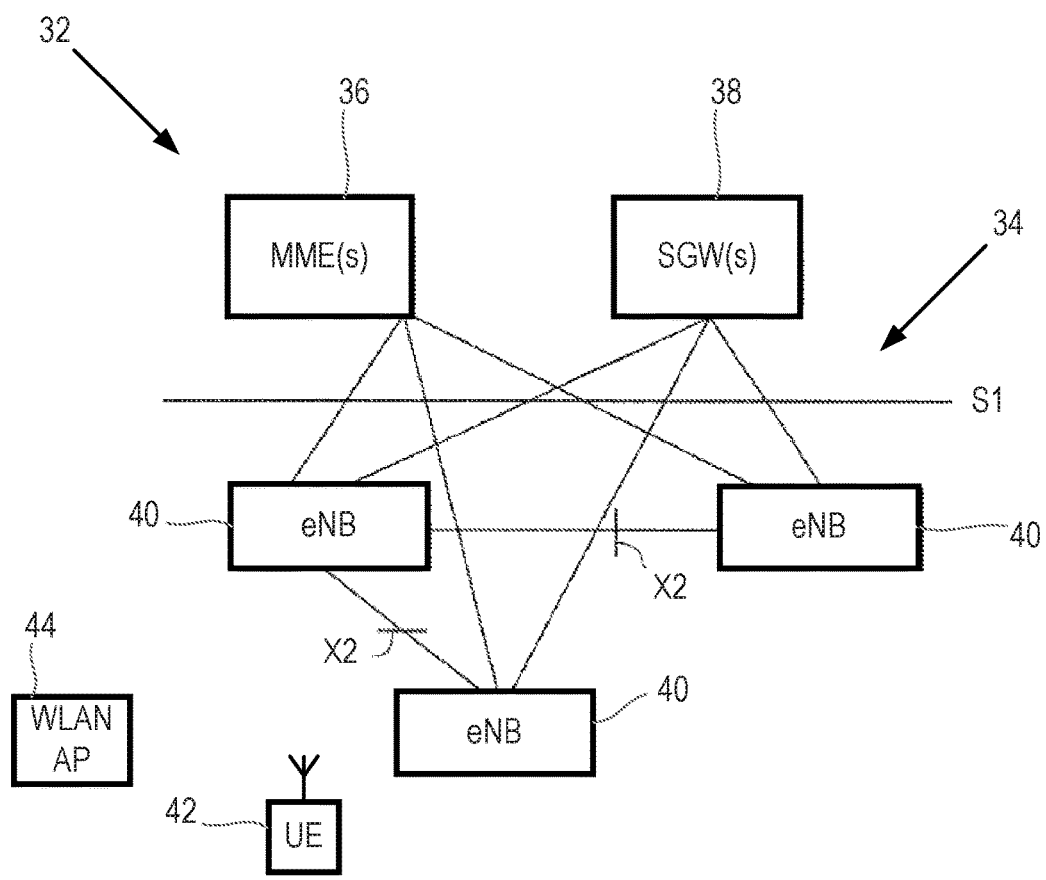
FIG. 2 illustrates an LTE network and WLAN APs.

FIG. 2 shows an example diagram of an evolved UMTS Terrestrial Radio Access Network (E-UTRAN) architecture as part of an LTE-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42. Although not part of the E-UTRAN architecture, a WLAN access point (AP) 44 is also shown in FIG. 2. The UE 42 can receive downlink data from and send uplink data to the AP 44.

Figure 3:
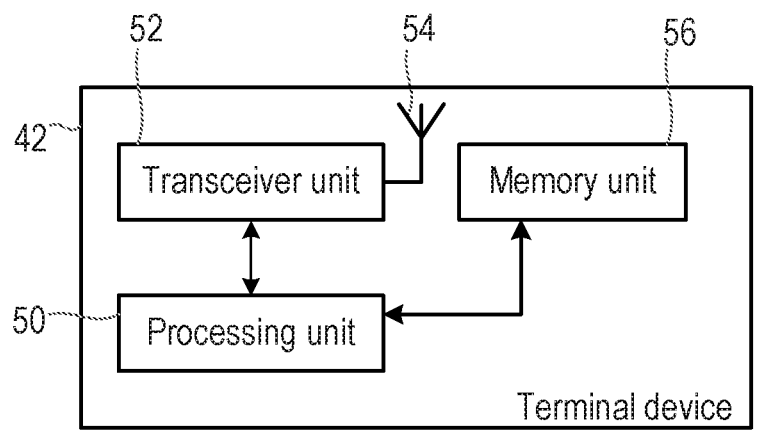
FIG. 3 is a block diagram of a terminal device according to an embodiment.

FIG. 3 shows a terminal device (UE) 42 that can be adapted or configured to operate according to one or more of the non-limiting example embodiments described. The UE 42 comprises a processor or processing unit 50 that controls the operation of the UE 42. The processing unit 50 is connected to a transceiver unit 52 (which comprises a receiver and a transmitter) with associated antenna(s) 54 which are used to transmit signals to and receive signals from a base station 40 in the network 32 and to transmit signals to and receive signals from a WLAN AP 44. The UE 42 also comprises a memory or memory unit 56 that is connected to the processing unit 50 and that contains instructions or computer code executable by the processing unit 50 and other information or data required for the operation of the UE 42.

Figure 4:
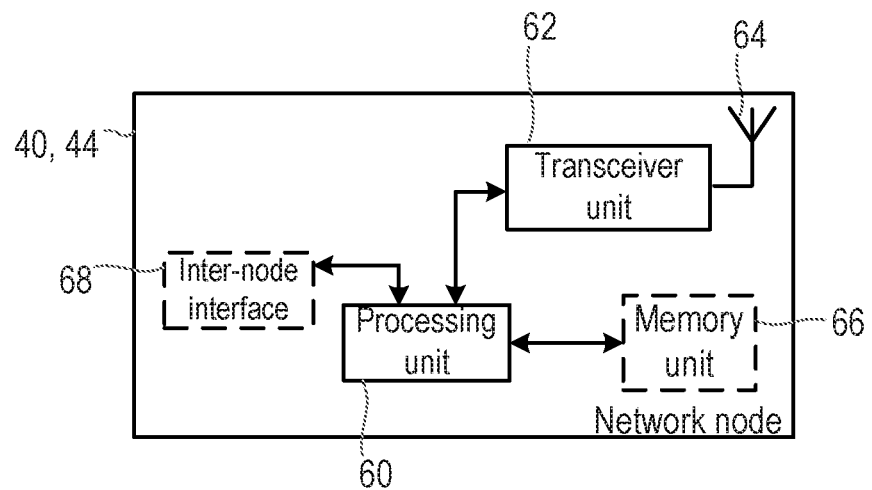
FIG. 4 is a block diagram of a network node according to an embodiment.

FIG. 4 shows a network node (for example a cellular network base station such as a NodeB or an eNodeB, or a WLAN AP) that can be adapted or configured to operate according to the example embodiments described. The network node 40 comprises a processor or processing unit 60 that controls the operation of the network node 40. The processing unit 60 is connected to a transceiver unit 62 (which comprises a receiver and a transmitter) with associated antenna(s) 64 which are used to transmit signals to, and receive signals from, UEs 42 in the network 32. The network node 40 also comprises a memory or memory unit 66 that is connected to the processing unit 60 and that contains instructions or computer code executable by the processing unit 60 and other information or data required for the operation of the network node 50. The network node 40 also includes components and/or circuitry 68 for allowing the network node 40 to exchange information with another network node 40 (for example via an X2 S1 and/or Xw interface). It will be appreciated that base stations for use in other types of network (e.g. UTRAN or Wideband Code Division Multiple Access (WCDMA) radio access network (RAN)) will include similar components to those shown in FIG. 4 and appropriate interface circuitry 68 for enabling communications with the other network nodes in those types of networks (e.g. other base stations, APs mobility management nodes and/or nodes in the core network).

It will be appreciated that only the components of the UE 42 and network node 40 required to explain the embodiments presented herein are illustrated in FIGS. 3 and 4.

As described above, a terminal device 42 can be provided with a set of identifiers of network nodes that can be considered by the terminal device when performing aggregation, access network selection or traffic steering. This set (or mobility set) may be updated over time. The techniques described herein provide ways for a terminal device 42 to report failures in connections to network nodes having an identifier in the mobility set.

According to mechanisms that are currently being developed in 3GPP, the UE 42 may be allowed to move between WLAN APs 44 that have identifiers in the mobility set based on e.g. a UE implementation specific and/or a WLAN-controlled mobility decision mechanism, while the UE 42 may not be allowed to move to other WLANs 44 that do not match the provided identifiers.

FIG. 5 illustrates a general method of operating a terminal device 42 according to an embodiment. The terminal device 42 is configured for access network selection, traffic steering and/or traffic aggregation through a network node in a first network operating according to a first radio access technology, RAT, and a network node operating according to a second RAT. The first RAT can be, for example, a cellular communication network technology, such as GSM, UMTS, LTE, etc., or a local area network technology, such as WLAN or Wi-Fi. The second RAT is a different RAT to the first RAT, but can also be any of a cellular communication network technology, such as GSM, UMTS, LTE, etc., or a local area network technology, such as WLAN or Wi-Fi. In a preferred embodiment, the first RAT is a cellular communication network technology, the node in the first network is a base station or eNB, the second RAT is WLAN or Wi-Fi and nodes operating according to the second RAT are WLAN APs or Wi-Fi APs.

The terminal device 42 has a mobility set comprising identifiers for one or more network nodes operating according to the second RAT that can be used for access network selection, traffic steering and/or traffic aggregation. This mobility set may have been provided to the terminal device 42 by the first network or a node operating according to the second RAT, or it could have been obtained by the terminal device 42 from an access network discovery and selection function, ANDSF, policy, or from a subscriber identity module (SIM).

Each identifier may uniquely identify a network node or a group of network nodes operating according to the second RAT. In the preferred embodiment, each identifier can be an identifier used in WLANs, which includes Service Set Identifiers (SSIDs), Extended SSIDs (ESSIDs), Homogeneous ESSIDs (HESSIDs), Basic SSIDs (BSSIDs), or a realm identifier.

The identifiers in the set may relate to network nodes operating according to the second RAT that are part of a single network (e.g. a second network that is operated by a single WLAN operator). Alternatively the identifiers may relate to network nodes that are in different networks and/or that are 'stand-alone' network nodes (i.e. that are not considered part of a wider network of nodes).

According to the method, in step 101, on occurrence of a failure condition with respect to a connection to one or more network nodes operating according to the second RAT having an identifier in the mobility set, the terminal device 42 sends a failure indication message to the first network to signal the occurrence of the failure condition.

Thus, for example, the method provides that if a failure condition occurs for a connection to a WLAN AP 44 that has an identifier in the mobility set, the terminal device 42 sends a failure indication message to the 3GPP network.

FIG. 6 illustrates a general method of operating a network node 40 according to an embodiment. The network node 40 operates according to a first RAT and is considered part of a first network. In step 111, the network node 40 receives a failure indication message from a terminal device 42. This failure indication message indicates or signals the occurrence of a failure condition with respect to a connection to one or more network nodes 44 operating according to a second RAT and that have an identifier in a mobility set in the terminal device.

As noted in more detail below, the method of operating the network node 40 may further comprise the step of taking one or more actions in response to receiving the failure indication message, or in response to the content of the failure indication message. Some exemplary actions are described in more detail below.

The method of operating the network node 40 may further comprise the step of sending the mobility set (or the identifiers for the mobility set) to the terminal device 42.

In the above embodiment, the first RAT can be, for example, a cellular communication network technology, such as GSM, UMTS, LTE, etc., or a local area network technology, such as WLAN or Wi-Fi. The second RAT is a different RAT to the first RAT, but can also be any of a cellular communication network technology, such as GSM, UMTS, LTE, etc., or a local area network technology, such as WLAN or W-Fi. In a preferred embodiment, the first RAT is a cellular communication network technology, the node in the first network is a base station or eNB, the second RAT is WLAN or Wi-Fi and nodes operating according to the second RAT are WLAN APs or Wi-Fi APs.

Thus, the above methods provide that the first network is informed about connection failures to network nodes that are operating according to a different RAT, where those network nodes are listed in a mobility set of the terminal device and can be used for access network selection, traffic steering and/or traffic aggregation. In some embodiments the first network can take action to adapt the first network/second RAT aggregation or interworking setup which can improve the end user performance and experience.

Various exemplary failure conditions are described below, along with various embodiments of the failure indication message. In these examples and embodiments, the first network is a 3GPP network (specifically a LTE network), the terminal device 42 is a UE, the UE 42 is connected to an eNB 40 in the first network, the second RAT is WLAN, and the set of identifiers (the mobility set) is used by the UE 42 to determine which WLAN AP 44 should be used for traffic aggregation. It will be appreciated however that each of the following embodiments are also more generally applicable to other types of RATs and network nodes.

Some exemplary embodiments of the failure indication message are set out below. The UE 42 can be configured to send any one or more of these types of failure indication message.

Type A—with this type, a single failure indication message is sent per aggregation configuration (i.e. per mobility set), and may or may not include a reason code (i.e. a code indicating the reason for the connection failure). The following subtypes are defined:

A1: the UE 42 sends a failure indication message after trying to detect and attempting to connect to all WLANs 44 in the mobility set;

A2: the UE 42 sends a failure indication message after trying to detect and attempting to connect to a certain percentage of or a certain number of the WLANs 44 in the mobility set;

A3: the UE 42 sends a failure indication message after trying to detect and attempting to connect to WLANs 44 over a predetermined period of time.

The A1 subtype provides an advantage that the UE 42 will send a failure report only if the UE 42 fails to connect to all WLANs 44 in the mobility set. This ensures that the UE 42 does not give up any opportunity to perform WLAN operation and hence it increases the amount of offloading which can be achieved. Thus system performance and user experience can be improved.

The A3 subtype provides similar advantages to subtype A1, but also provides the benefit that the UE 42 will not attempt to connect to WLANs 44 if it takes too long. Instead the UE 42 will only attempt to connect to a WLAN 44 for a certain period of time before giving up. Thus, the UE 42 can stop attempting to connect to a WLAN 44 if the UE 42 has not succeeded after the predetermined period of time as the likelihood of a successful attempt decreases the longer that the UE 42 attempts to connect to a WLAN 44 (which corresponds to an increasing number of attempts to connect to a WLAN 44). The A3 subtype is particularly useful if it is assumed that the UE 42 first attempts to connect to a 'good' WLAN 44, where 'good' may be measured e.g. in signal strength, etc. In addition it is useful that the UE 42 sends a failure report to the eNB 40 in a timely manner since this allows the eNB 40 to know that this particular UE 42 cannot connect to WLAN 44. The eNB 40 may then try to steer another UE 42 to WLAN 44 and hence system capacity and user experience can be improved.

Type B—with this type, a failure indication message is sent per WLAN identifier that a failure condition occurs for, and may or may not include a reason code. The following subtypes are defined:

B1: the UE 42 sends a failure indication message for each WLAN 44 in the mobility set that it has not been able detect or for which a connection attempt has failed;

B2: the UE 42 sends a failure indication message for each WLAN 44 in the mobility set that it has detected but for which a connection attempt has failed;

B3: the UE 42 sends a failure indication message for each WLAN 44 in the mobility set that the UE 42 has not been able to detect;

B4: the UE 42 monitors for the expiry of a predetermined time period, after which the UE 42 does not send a WLAN-specific failure indication message (i.e. types B1-B3), and the UE 42 may instead send a type A failure indication message or another indication indicating that the timer has stopped or expired.

Type C—with this type the UE 42 can send a failure indication message without attempting to connect to any WLAN 44. This type may be used where, e.g., due to user preferences the UE 42 should not or cannot connect to the WLANs 44 indicated in the mobility set, which may be due to the WLAN transceiver circuitry in the UE 42 being turned off or deactivated, or a non-mobility set (e.g. private) WLAN 44 having been selected by the user.

Type C failure indication messages are advantageous since if a UE 42 knows that it cannot connect to a WLAN 44 indicated by the network, the UE 42 may save power since it does not need to perform unnecessary connection attempts (since it should not connect to such WLANs 44), and instead it can directly indicate this to the eNB 40. The eNB 40 may then attempt to steer another UE 42 to WLAN 44. Thus, this can improve system performance and user experience.

For type A failure indication messages, the separation of being able to detect or attempt to connect may not result in a difference in the operation of the UE 42 as the UE 42 may not send (e.g. suppress) failure indication messages if it is finally able to connect to a WLAN 44. The UE may, however, send the failure indication message independently of whether it finally connects to a WLAN 44 or not. The UE 42 can include a reason code for the failed detections or failed attempts to connect.

The eNB 40 can configure the UE 42 to send particular types of failure indication message (or failure indication messages for particular types of failure), e.g. only type A, type B, etc., or specific subtypes, e.g. type Ai or type Bi.

The embodiments below set out how a UE 42 can send failure indication messages to the network (eNB 40).

Figure 7:
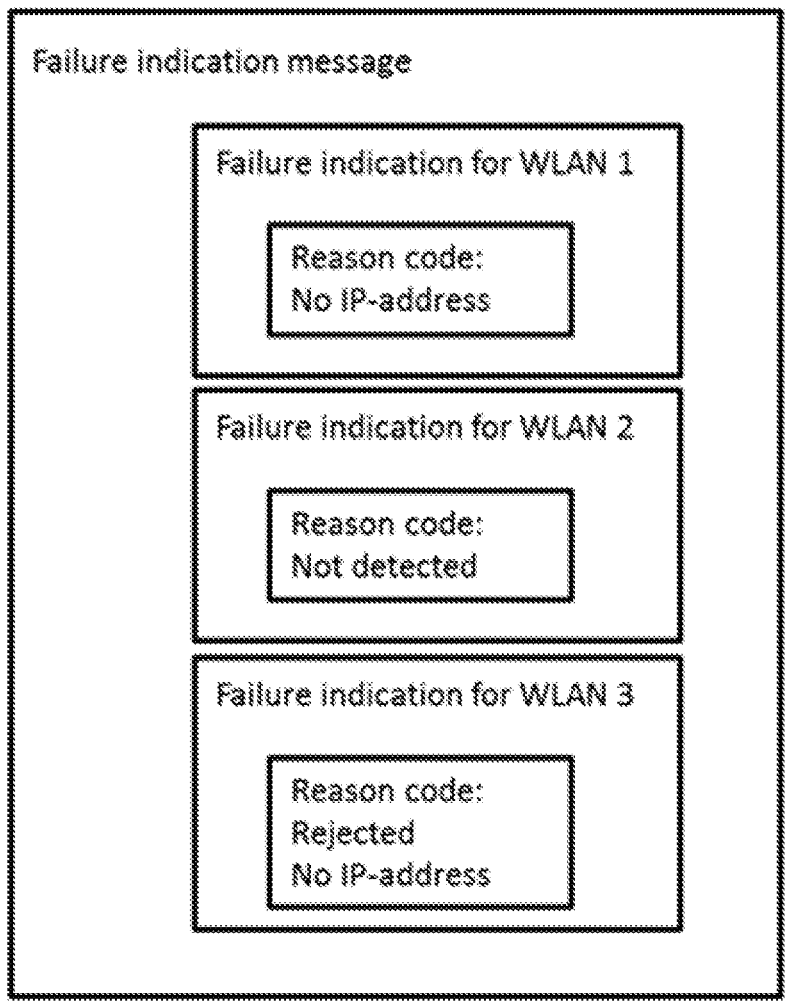
FIG. 7 shows an exemplary failure indication message.

A failure indication message may contain one or more failure indications. For example if the UE has attempted, but failed, to connect to two WLANs 44 the UE 42 may send a failure indication message to the eNB 40. In that failure indication message the UE 42 may indicate one failure indication per connection attempt, per WLAN identifier, etc. Each failure indication (in the failure indication message) may contain one or more reason codes. An exemplary failure indication message is shown in FIG. 7. The message includes a respective failure indication and reason code for three WLANs 44 (WLAN 1, WLAN 2 and WLAN 3).

In an alternative embodiment, a failure indication message may have a structure by which the UE 42 sends just one failure indication for the mobility set.

It should be noted that when a UE is said to be 'connected' to a WLAN, 'connected' can for example comprise one or more of the following events:

802.11 authentication (Authentication to the WLAN AP) has been completed or is under way;

802.1x EAP-SIM authentication (Authentication to the authentication, authorisation and accounting (AAA)-servers) has been completed or is under way;

Four-way hand-shake between the terminal and the WLAN network has been completed;

An IP address has been assigned to the terminal in WLAN;

A PDN connection has been established through the WLAN network, i.e., a connection between the terminal and the PDN gateway;

Data traffic has been started through the WLAN network.

It should also be appreciated that the failure indication may be an indication of failed traffic steering; aggregation of traffic, connections, flows, bearers, and on data unit level; offloading, etc.

Failure Indication Handling with a Mobility Set

Figure 8:
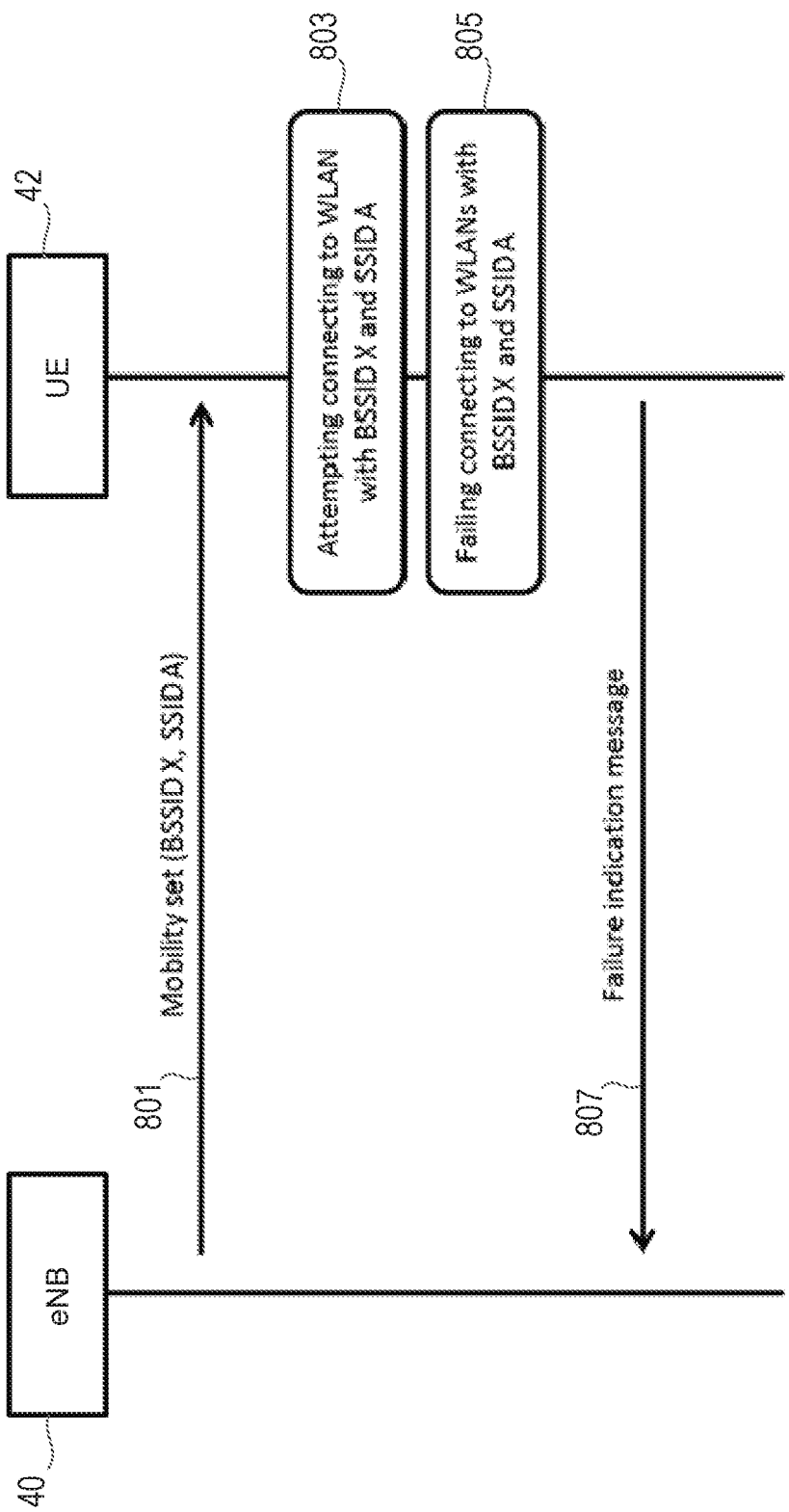
FIG. 8 illustrates an embodiment of the signalling between a terminal device and a network node when a failure condition occurs.

In one embodiment (type A1) the UE will send a failure indication message to the network if the UE has attempted to connect to all nodes applicable to the UE's mobility set but has not succeeded in connecting to any of them. With reference to the signalling shown in FIG. 8, if the UE 42 is provided with the mobility set {BSSID X, SSID A} (signal 801) and the UE has attempted to connect to WLANs with BSSID X, and WLANs with SSID A (step 803) and all these attempts have failed (step 805), then according to this embodiment the UE would send the failure indication message to the network (signal 807).

Figure 9:
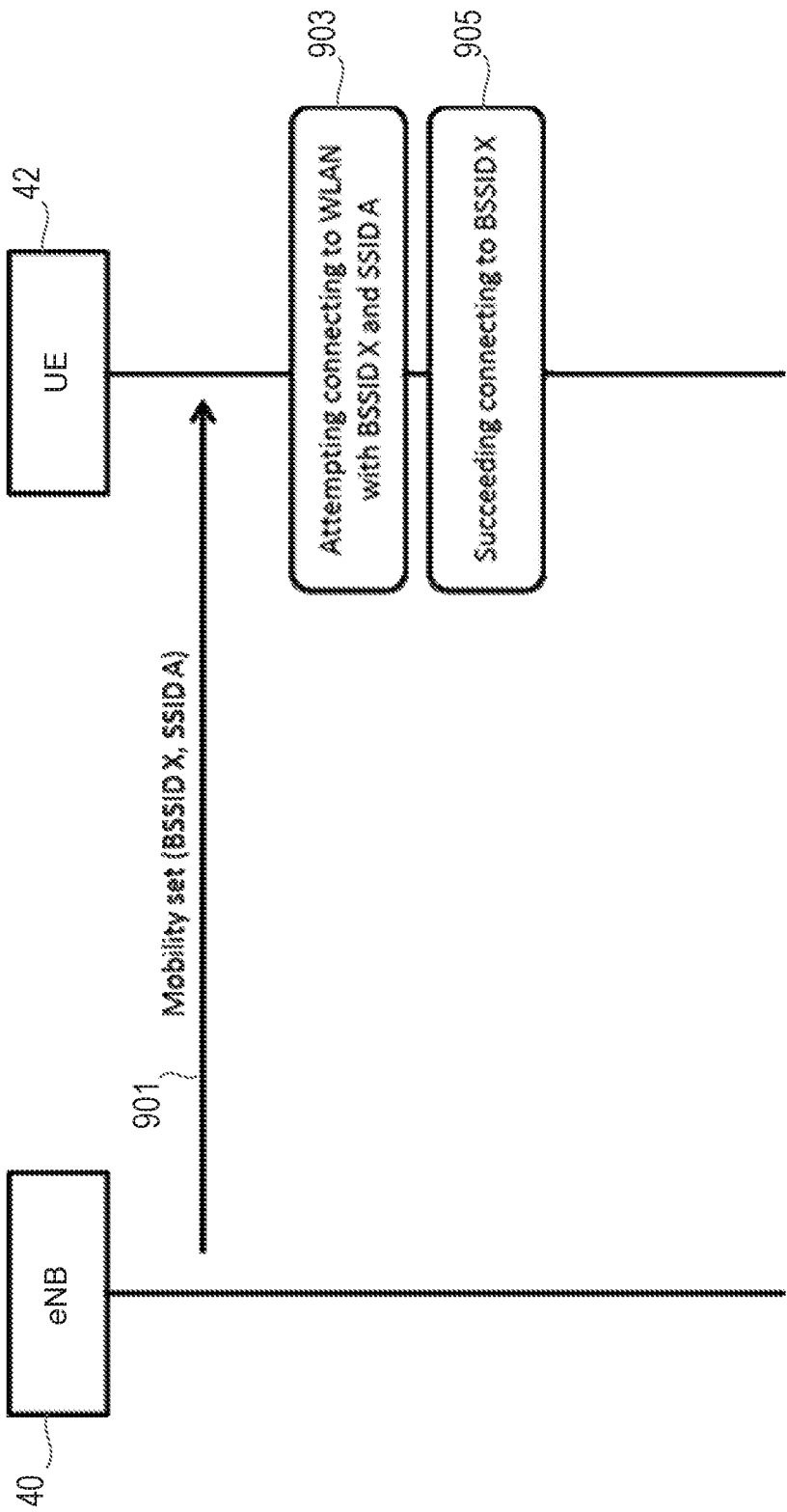
FIG. 9 illustrates an embodiment of the signalling between a terminal device and a network node when the terminal device successfully connects to a network node.

It should be noted that a single WLAN identifier, e.g. SSID A, may refer to a set of WLAN nodes 44, and that in this case the UE 42 may attempt to connect to all of them and report failure only if the connection attempt to all of them fails (where "all of them" may comprise the WLANs which are detectable to the UE). With reference to FIG. 9, if the UE 42 is provided with the mobility set {BSSID X, SSID A} (signal 901) and the UE attempts to connect to WLANs with BSSID X, SSID A (step 903) and succeeds in connecting to a WLAN with BSSID X (step 905) then the UE 42 refrains from sending a failure indication message.

Type A2 refers to the case where the UE 42 attempts to connect to a subset of the WLANs within the mobility set and type A3 refers to the case where the UE 42 has a timer running during which it will attempt to connect WLANs having identifiers in the mobility set.

Non-Detectable WLANs

In some cases the UE 42 may not be able to detect some or all of the WLANs in its mobility set. For example if the UE 42 has a BSSID Y in its mobility set and the UE is not in the coverage area of BSSID Y, then the UE may not be able to even detect BSSID Y and hence cannot attempt to connect to that WLAN.

In some embodiments the UE will not consider a connection attempt as failed if the UE has not detected a WLAN. This means that the UE will only send a failure indication message for WLANs that the UE has actually attempted to connect to (as in type B2 above). However it may result in no failure indication message being sent at all, for example if the UE is not in the coverage area of any WLAN in the mobility set. This may be beneficial in some cases when the first network is not interested in knowing that the UE is not in the coverage of a WLAN. For example, if the network is using the failure indication message to determine whether the WLAN APs operate as expected (e.g. providing the UE with an IP address, etc.) then it may not be meaningful for the UE to indicate that it is not in the coverage of WLAN APs.

On the other hand, if the network would like to use the failure indication for handling the UE's mobility set (i.e. adding/removing WLANs from the UE's mobility set) then it may be desirable for the UE to report to the network when it fails to detect WLANs in its mobility set as such WLANs could be removed from the mobility set. Thus, according to another embodiment the UE will consider a non-detected WLAN as a failure condition and hence include a failure indication for that WLAN (as in type B3 described above). This embodiment can result in the UE sending a failure indication message when the UE does not detect any WLAN. As will be explained below, the UE may provide a specific reason code in the failure indication message to indicate that the UE failed to connect to a WLAN due to that WLAN not being detected.

Suppressed Connection Attempts

In some embodiments the UE may create and send connection failure indications without actually performing the connection attempts. Reasons for this may be that the end user of the UE has a preference which prevents the UE from connecting to the WLANs in the UE's mobility set (or maybe even prevents connection to any WLAN).

A reason why the UE may not be allowed to connect to the WLANs could be that the WLAN transceiver circuitry/chipset is (directly or indirectly) turned off by the end user. This may be done if the end user, for example, wants to save power. Another reason could be that the end user has selected to connect to some other WLAN, e.g. a home WLAN or a WLAN in a coffee shop or similar. Since the UE may only be able to be connected to a single WLAN at a time, the UE may not even be able to attempt to connect to the WLANs in the mobility set. Hence, according to some embodiments, the UE considers a connection attempt which was suppressed or not performed as a failed connection attempt. See type C described above.

Reason Codes

As described above, a failure indication message may contain a reason code to assist the network in understanding why the UE failed to connect to the WLAN(s). This is helpful for the network to determine which, if any, action to take. For example if the UE failed to connect to WLAN(s) as a result of the WLAN circuitry/chipset in the UE being switched off due to an end user preference, then the network may request the UE to stop attempting connecting to (any) WLANs. While on the other hand if the UE fails to connect to a certain WLAN due to that the UE did not get any IP-address from this particular WLAN, then the network may remove that particular WLAN from the UE's mobility set to avoid the UE attempting and failing to connect to that WLAN again. In addition, if the UE fails to connect to a certain WLAN because that WLAN is not detected then the network may leave that WLAN in the UEs mobility set with the view that the UE may later detect and connect to that WLAN.

Figure 10:
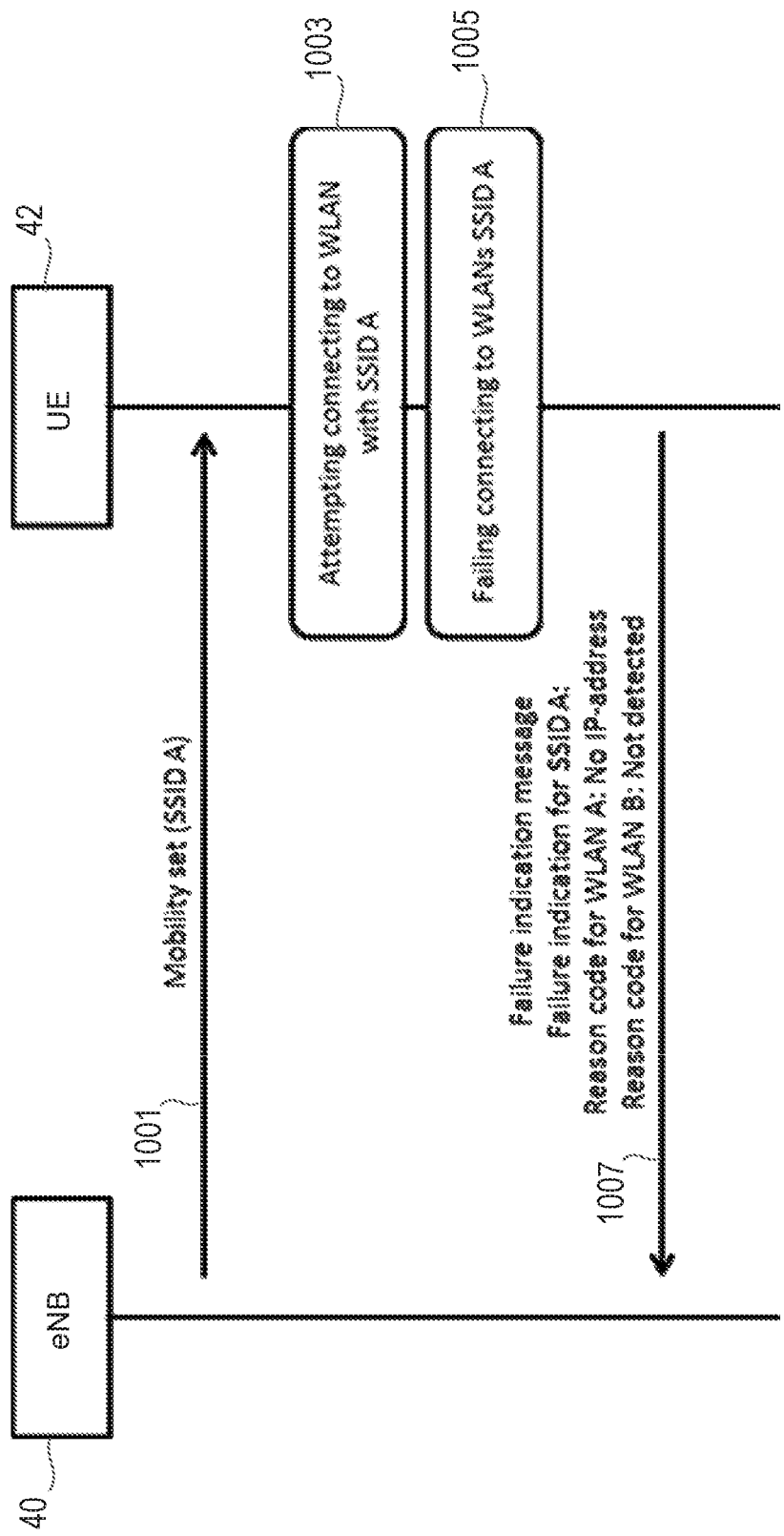
FIG. 10 illustrates another embodiment of the signalling between a terminal device and a network node when a failure condition occurs.

The reason code provided in the failure indication message may indicate which type of failure condition has occurred (e.g. type Ai, etc). In some embodiments, where the UE has failed to connect to a WLAN or group of WLANs, rather than simply indicate that a failure to connect has occurred, the reason code may provide a more detailed reason for the failure. For example, the possible reason codes could include:

the UE's connection attempt gets rejected by the WLAN the UE gets disconnected (after it has connected to the WLAN)

the UE fails to get an IP address the UE fails to get authenticated the UE does not detect the WLAN (in the case that a certain WLAN identifier addresses a group of WLANs (e.g. an SSID, HESSID, Realm) then the UE may consider that it has detected a WLAN if the UE has detected at least one WLAN with that WLAN identifier)

connection establishment was not successful after attempting to connect for a certain length of time the WLAN connection quality or strength or received (e.g. beacon) signal strength or detectability of WLAN is below a certain (configured) threshold, perhaps for a certain (configured) amount of time the UE fails to connect due to suppressed connections (e.g. WLAN circuitry/chipset is unable to connect due to a user preference, or due to a UE implementation specific mechanism (which may be referred to as Local Operating Environment) deeming a connection to the WLAN as unsuitable Handling of Reason Codes in Scenarios with Multiple WLAN Identifiers in the Mobility Set In a scenario where the UE has a WLAN identifier in its mobility set that is applicable to multiple WLANs, e.g. an SSID, HESSID, etc., then the UE may fail to connect to the different WLANs applicable to that WLAN identifier for different reasons. For example, with reference to the signalling shown in FIG. 10, if the UE is configured (signal 1001) with a SSID A which comprises WLAN A and WLAN B then the UE may attempt to connect to the these WLANs (step 1003) and fail to connect (step 1005) to WLAN A due to no IP address being acquired, and fail to connect to WLAN B due to it not being detected, and so on. UE can send a failure indication message to the eNB 40 (signal 1007) that includes a failure indication for SSID A with a reason code for WLAN A and a separate reason code for WLAN B. Therefore in some embodiments the UE indicates multiple failure reason codes in a failure indication for a particular WLAN identifier.

Where multiple reason codes are included in the failure indication message, the UE may send one common reason code per WLAN AP or it may include one reason code per WLAN identifier.

Per WLAN AP Granularity—

The highest granularity to send a reason code with is to associate it with a specific WLAN AP (i.e. associated it with a BSSID). This provides the most information to the network and could assist the network in removing a certain WLAN AP from the UE's mobility set. Also it would allow for the network to be aware of whether a certain WLAN AP is having problems, e.g. if a certain WLAN AP never admits any UEs then there may be a problem with this WLAN AP and hence it needs to be upgraded, etc. However, while this embodiment provides the most information to the network, it also creates the most signalling overhead.

Per WLAN Identifier Granularity—

Alternatively, to reduce the amount of signalling overhead, the UE may provide reason codes for WLAN identifiers, e.g. send reason codes for a certain SSID. This may be useful for example to indicate that the UE does not detect WLANs of a certain SSID/HESSID. However, the UE may for one SSID send multiple reason codes without indicating exactly which WLAN AP the reason codes are associated with.

Reason Codes Per Mobility Set

Figure 11:
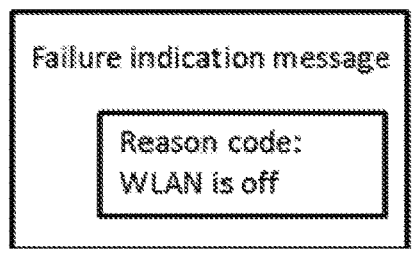
FIG. 11 illustrates another exemplary failure indication message.

In some cases it may be preferable for the UE to send reason codes applicable to the whole mobility set. For example if the UE fails to connect to a WLAN due to the WLAN circuitry/chipset being turned off, then this approach can be used. An exemplary failure indication message in which a reason code is provided for the whole mobility set is shown in FIG. 11.

Providing WLAN Identifiers in Failure Indication

As has been explained herein, the UE may provide reason codes for the connection failure. In doing so the UE may indicate to the network which WLANs the reason code is applicable to. For example, the UE may send a failure indication for a certain WLAN AP and the UE could indicate the reason for the failure condition for this WLAN AP. In doing so it may be beneficial for the network to know not only what the BSSID of the WLAN is but also one or more group identifiers for the WLAN (e.g. the SSID, HESSID and/or Realm of the WLAN). Hence, in some embodiments the UE can indicate to the eNB not only the BSSID of the WLANs that the reason code(s) applies to, but also the SSID, HESSID and/or Realm of the WLAN. This is useful, for example, if the eNB configures the UE with an SSID in the UE's mobility set but the eNB does not know which particular WLAN APs belong to that SSID (i.e. the eNB is not aware of the BSSIDs associated to this SSID). Thus, it would be beneficial if the UE indicates not only the BSSID of the WLAN APs that the failure condition occurred for, but also the SSID of those WLANs.

Network Actions Upon Reception of the Failure Indication

As noted above, when the network (e.g. eNB 40) receives the failure indication message, the network may take one or more actions. Some example actions include:

Removing part of the mobility set for the UE (e.g. removing one or more identifiers)

Adding other WLANs identifiers to the mobility set for the UE

Configuring the UE to stop using WLAN aggregation/interworking.

Collecting statistics about network performance. For example, statistics can be collected to determine whether a certain WLAN is working as intended. The network operator can then, based on this information, upgrade/reconfigure/etc. the WLAN APs or other parts of the WLAN network.

Within the network, e.g. if the eNB receives the failure indication, it may configure the WLAN network nodes(s) so that they are not available for the UE; e.g. it may reconfigure the WLAN nodes so that they operate with a different set of identifiers. This (re)configuration may happen through an established interface between an eNB and WLAN node, e.g. Xw. In another embodiment the eNB may remove or change the Xw interface.

Realization of Failure Indication

In some embodiments the failure indication message is part of a radio resource control (RRC) message in LTE, which means that the recipient of the failure indication is the eNB. The eNB may forward the failure indication message (or the information contained in the failure indication message) to a further network node in the LTE network or a network node in the WLAN.

In an alternative embodiment, the failure indication message is realized as a new reason type within a secondary cell group (SCG) failure indication message, which indicates a failure of the SCG for LTE dual connectivity. SCG failure indication messages are described in 3GPP TS 36.331, v12.6.0, section 5.6.13.

In some embodiments the failure indication message is only sent to the network if the UE is in RRC connected mode, and the UE does not attempt LTE RRC connection establishment just to be able to send the failure indication message in LTE when the failure is triggered in WLAN.

eNB Configuring UE with Different Types of Failure Indication/Failure Indication Messages The network may configure the UE to send different types of failure indications/failure indication messages depending on the requirements of the network. For example the network may configure the UE to send messages for type A and type C failure conditions. Or, for example, it may be specified that the UE always send messages for type C failure conditions but type A and type B are configurable, etc.

Figure 12:
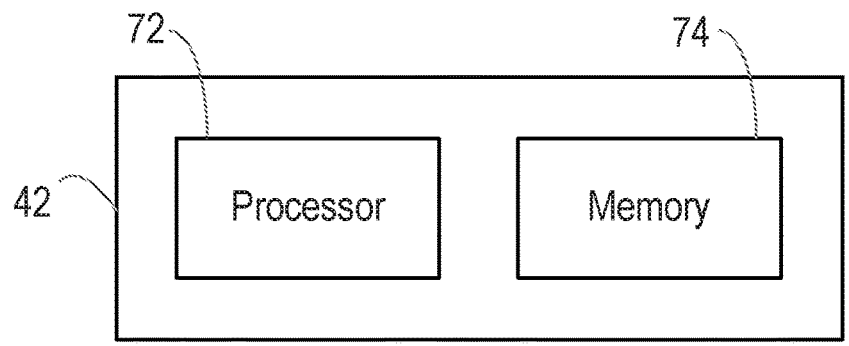
FIG. 12 is a block diagram of a terminal device according to another embodiment.

FIG. 12 is a block diagram of an alternative terminal device 42 that can be used in the example embodiments described herein. The terminal device 42 is for use with a first network operating according to a first radio access technology, RAT, and network nodes 44 operating according to a second RAT, The terminal device 42 comprises a processor 72 and a memory 74. The terminal device 42 has a mobility set comprising identifiers for one or more network nodes 44 operating according to the second RAT that can be used for access network selection, traffic steering and/or traffic aggregation. The memory 74 contains instructions executable by the processor 72, and on execution of those instructions, the terminal device 42 is operative to, on occurrence of a failure condition with respect to a connection to one or more network nodes 44 operating according to the second RAT having an identifier in the mobility set, send a failure indication message to the first network to signal the occurrence of the failure condition to the first network.

Figure 13:
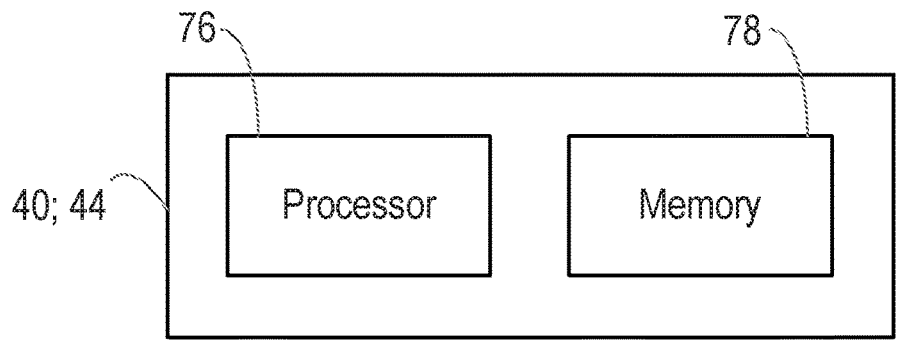
FIG. 13 is a block diagram of a network node according to another embodiment.

FIG. 13 is a block diagram of an alternative network node 40, 44 (which, as above, can be a base station 40 or AP 44) that can be used in the example embodiments described herein. The network node 40; 44 is for use in a first network that is operating according to a first radio access technology, RAT. The network node 40, 44 comprises a processor 76 and a memory 78. The memory 78 contains instructions executable by the processor 76, and on execution of those instructions, the network node 40, 44 is operative to receive a failure indication message from a terminal device 42, the failure indication message indicating the occurrence of a failure condition with respect to a connection to one or more network nodes operating according to a second RAT and that have an identifier in a mobility set in the terminal device 42.

Figure 14:
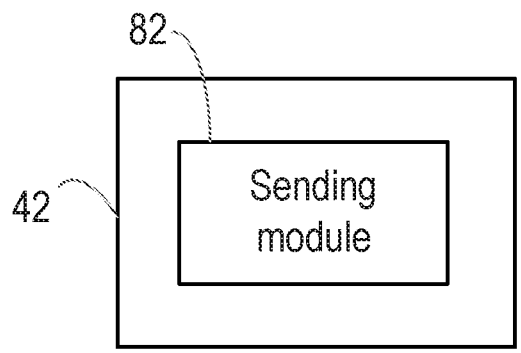
FIG. 14 is a block diagram of a terminal device according to yet another embodiment.

FIG. 14 is a block diagram of another alternative terminal device 42 that can be used in the example embodiments described herein. The terminal device 42 is for use with a first network operating according to a first radio access technology, RAT, and network nodes 44 operating according to a second RAT, The terminal device 42 comprises a sending module 82. The terminal device 42 has a mobility set comprising identifiers for one or more network nodes 44 operating according to the second RAT that can be used for access network selection, traffic steering and/or traffic aggregation. The sending module 82 is configured to, on occurrence of a failure condition with respect to a connection to one or more network nodes 44 operating according to the second RAT having an identifier in the mobility set, send a failure indication message to the first network to signal the occurrence of the failure condition to the first network.

Figure 15:
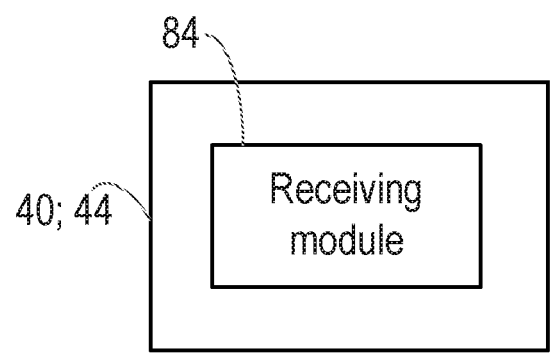
FIG. 15 is a block diagram of a network node according to yet another embodiment.

FIG. 15 is a block diagram of another alternative network node 40, 44 (which, as above, can be a base station 40 or AP 44) that can be used in the example embodiments described herein. The network node 40, 44 is for use in a first network that is operating according to a first radio access technology, RAT. The network node 40, 44 comprises a receiving module 84. The receiving module 84 is configured to receive a failure indication message from a terminal device 42, the failure indication message indicating the occurrence of a failure condition with respect to a connection to one or more network nodes operating according to a second RAT and that have an identifier in a mobility set in the terminal device 42.

Thus, the techniques described herein provide a solution for efficiently handling messages in respect of connection failures (e.g. to a WLAN) for a UE that also has a connection to a cellular network.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various exemplary embodiments of the methods, terminal devices and network nodes described herein are set out in the following statements:

1. A method of operating a terminal device, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, the method comprising:

on occurrence of a failure condition with respect to a connection to one or more network nodes operating according to the second RAT having an identifier in the mobility set, sending a failure indication message to the first network to signal the occurrence of the failure condition to the first network;

wherein the failure condition comprises:

the terminal device failing to connect to all of the network nodes operating according to the second RAT that have an identifier in the mobility set;

the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

2. A method of operating a terminal device, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, the method comprising:

on occurrence of a failure condition with respect to a connection to one or more network nodes operating according to the second RAT having an identifier in the mobility set, sending a failure indication message to the first network to signal the occurrence of the failure condition to the first network;

wherein the failure condition comprises:

the terminal device failing to connect to all of the network nodes operating according to the second RAT that have an identifier in the mobility set during a predetermined time period;

the terminal device failing to detect all of the network nodes operating according to the second RAT that have an identifier in the mobility set during a predetermined time period; or the terminal device failing to connect to all of the network nodes operating according to the second RAT that have an identifier in the mobility set and that have been detected by the terminal device during a predetermined time period.

3. A method of operating a terminal device, the terminal device being configured to communicate with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, the method comprising:

on occurrence of a failure condition with respect to a connection to one or more network nodes operating according to the second RAT having an identifier in the mobility set, sending a failure indication message to the first network to signal the occurrence of the failure condition to the first network;

wherein the failure condition comprises:

a user preference indicating that the terminal device is not to connect to any network nodes operating according to the second RAT having an identifier in the mobility set; or communication circuitry in the terminal device for use in communicating with network nodes operating according to the second RAT being deactivated or disabled.

4. The method of any of statements 1-3, wherein the method further comprises the step of:

receiving the mobility set from the first network or a network node operating according to the second RAT.

5. The method of any of statements 1-3, wherein the method further comprises the step of:

obtaining the mobility set from an access network discovery and selection function, ANDSF, policy.

6. The method of any of statements 1-5, wherein a failure indication message is sent for each failure condition that occurs.

7. The method of any of statements 1-6, wherein the failure indication message indicates the network node or network nodes operating according to the second RAT having an identifier in the mobility set for which the failure condition occurred.

8. The method of any of statements 1-6, wherein the failure indication message indicates the identifiers in the mobility set associated with the network node or network nodes operating according to the second RAT for which the failure condition occurred.

9. The method of statement 7 or 8, wherein the failure indication message also indicates one or more additional identifiers that are associated with the network node or network nodes operating according to the second RAT for which the failure condition occurred, wherein the one or more additional identifiers are not contained in the mobility set.

10. The method of any of statements 1-9, wherein the failure indication message is sent to the first network as part of a radio resource control, RRC, message.

11. The method of any of statements 1-9, wherein the failure indication message is sent to the first network as part of a secondary cell group, SCG, failure information message.

12. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device is configured to:

on occurrence of a failure condition with respect to a connection to one or more network nodes operating according to the second RAT having an identifier in the mobility set, send a failure indication message to the first network to signal the occurrence of the failure condition to the first network;

wherein the failure condition comprises:

the terminal device failing to connect to all of the network nodes operating according to the second RAT that have an identifier in the mobility set;

the terminal device failing to detect all of the network nodes operating according to the second RAT that have an identifier in the mobility set; or the terminal device failing to connect to all of the network nodes operating according to the second RAT that have an identifier in the mobility set and that have been detected by the terminal device.

13. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device is configured to:

on occurrence of a failure condition with respect to a connection to one or more network nodes operating according to the second RAT having an identifier in the mobility set, send a failure indication message to the first network to signal the occurrence of the failure condition to the first network;

wherein the failure condition comprises:

the terminal device failing to connect to all of the network nodes operating according to the second RAT that have an identifier in the mobility set during a predetermined time period;

the terminal device failing to detect all of the network nodes operating according to the second RAT that have an identifier in the mobility set during a predetermined time period; or the terminal device failing to connect to all of the network nodes operating according to the second RAT that have an identifier in the mobility set and that have been detected by the terminal device during a predetermined time period.

14. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device is configured to:

on occurrence of a failure condition with respect to a connection to one or more network nodes operating according to the second RAT having an identifier in the mobility set, send a failure indication message to the first network to signal the occurrence of the failure condition to the first network wherein the failure condition comprises:

a user preference indicating that the terminal device is not to connect to any network nodes operating according to the second RAT having an identifier in the mobility set; or communication circuitry in the terminal device for use in communicating with network nodes operating according to the second RAT being deactivated or disabled.

15. The terminal device of any of statements 12-14, wherein the terminal device is further configured to:

receive the mobility set from the first network or a network node operating according to the second RAT.

16. The terminal device of any of statements 12-14, wherein the terminal device is further configured to:
obtain the mobility set from an access network discovery and selection function, ANDSF, policy.

17. The terminal device of any of statements 12-16, wherein a failure indication message is sent for each failure condition that occurs.

18. The terminal device of any of statements 12-17, wherein the failure indication message indicates the network node or network nodes operating according to the second RAT having an identifier in the mobility set for which the failure condition occurred.

19. The terminal device of any of statements 12-17, wherein the failure indication message indicates the identifiers in the mobility set associated with the network node or network nodes operating according to the second RAT for which the failure condition occurred.

20. The terminal device of statement 18 or 19, wherein the failure indication message also indicates one or more additional identifiers that are associated with the network node or network nodes operating according to the second RAT for which the failure condition occurred, wherein the one or more additional identifiers are not contained in the mobility set.

21. The terminal device of any of statements 12-20, wherein the failure indication message is sent to the first network as part of a radio resource control, RRC, message.

22. The terminal device of any of statements 12-20, wherein the failure indication message is sent to the first network as part of a secondary cell group, SCG, failure information message.

23. A method of operating a network node in a first network that is operating according to a first radio access technology, RAT, in which the method comprises:
receiving a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
the terminal device failing to connect to all of the network nodes operating according to the second RAT that have an identifier in the mobility set;
the terminal device failing to detect all of the network nodes operating according to the second RAT that have an identifier in the mobility set; or
the terminal device failing to connect to all of the network nodes operating according to the second RAT that have an identifier in the mobility set and that have been detected by the terminal device.

24. A method of operating a network node in a first network that is operating according to a first radio access technology, RAT, in which the method comprises:
receiving a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
the terminal device failing to connect to all of the network nodes operating according to the second RAT that have an identifier in the mobility set during a predetermined time period;
the terminal device failing to detect all of the network nodes operating according to the second RAT that have an identifier in the mobility set during a predetermined time period; or
the terminal device failing to connect to all of the network nodes operating according to the second RAT that have an identifier in the mobility set and that have been detected by the terminal device during a predetermined time period.

25. A method of operating a network node in a first network that is operating according to a first radio access technology, RAT, in which the method comprises:
receiving a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
a user preference indicating that the terminal device is not to connect to any network nodes operating according to the second RAT having an identifier in the mobility set; or communication circuitry in the terminal device for use in communicating with network nodes operating according to the second RAT being deactivated or disabled.

26. The method of any of statements 23-25, wherein the method further comprises the step of:
sending the mobility set to the terminal device.

27. The method of any of statements 23-26, wherein the method further comprises the step of:
performing one or more actions in response to the received failure indication message.

28. The method of statement 27, wherein the one or more actions comprises any of:
adding one or more identifiers for network nodes operating according to the second RAT to the mobility set in the terminal device;
removing one or more identifiers for network nodes operating according to the second RAT from the mobility set in the terminal device;
configuring the terminal device to stop attempting to perform access network selection, traffic steering and/or traffic aggregation;
collecting statistics on the performance of the second network (i.e. a network operating according to the second RAT); and
reconfiguring one or more network nodes operating according to the second RAT.

29. The method of any of statements 23-28, wherein a failure indication message is received for each failure condition that occurs.

30. The method of any of statements 23-29, wherein the failure indication message indicates the network node or network nodes operating according to the second RAT having an identifier in the mobility set for which the failure condition occurred.

31. The method of any of statements 23-29, wherein the failure indication message indicates the identifiers in the mobility set associated with the network node or network nodes operating according to the second RAT for which the failure condition occurred.

32. The method of statement 30 or 31, wherein the failure indication message also indicates one or more additional identifiers that are associated with the network node or network nodes operating according to the second RAT for which the failure condition occurred, wherein the one or more additional identifiers are not contained in the mobility set.

33. The method of any of statements 23-32, wherein the failure indication message is received from the terminal device as part of a radio resource control, RRC, message.

34. The method of any of statements 23-32, wherein the failure indication message is received from the terminal device as part of a secondary cell group, SCG, failure information message.

35. A network node for use in a first network that is operating according to a first radio access technology, RAT, wherein the network node is configured to:
   receive a failure indication message from a terminal device, the failure indication message indicating the occurrence of a failure condition with respect to a connection to one or more network nodes operating according to a second RAT and that have an identifier in a mobility set in the terminal device;
   wherein the failure condition comprises:
   the terminal device failing to connect to all of the network nodes operating according to the second RAT that have an identifier in the mobility set;
   the terminal device failing to detect all of the network nodes operating according to the second RAT that have an identifier in the mobility set; or
   the terminal device failing to connect to all of the network nodes operating according to the second RAT that have an identifier in the mobility set and that have been detected by the terminal device.

36. A network node for use in a first network that is operating according to a first radio access technology, RAT, wherein the network node is configured to:
   receive a failure indication message from a terminal device, the failure indication message indicating the occurrence of a failure condition with respect to a connection to one or more network nodes operating according to a second RAT and that have an identifier in a mobility set in the terminal device;
   wherein the failure condition comprises:
   the terminal device failing to connect to all of the network nodes operating according to the second RAT that have an identifier in the mobility set during a predetermined time period;
   the terminal device failing to detect all of the network nodes operating according to the second RAT that have an identifier in the mobility set during a predetermined time period; or
   the terminal device failing to connect to all of the network nodes operating according to the second RAT that have an identifier in the mobility set and that have been detected by the terminal device during a predetermined time period.

37. A network node for use in a first network that is operating according to a first radio access technology, RAT, wherein the network node is configured to:
   receive a failure indication message from a terminal device, the failure indication message indicating the occurrence of a failure condition with respect to a connection to one or more network nodes operating according to a second RAT and that have an identifier in a mobility set in the terminal device;
   wherein the failure condition comprises:
   a user preference indicating that the terminal device is not to connect to any network nodes operating according to the second RAT having an identifier in the mobility set; or
   communication circuitry in the terminal device for use in communicating with network nodes operating according to the second RAT being deactivated or disabled.

38. The network node of any of statements 35-37, wherein the network node is further configured to send the mobility set to the terminal device.

39. The network node of any of statements 35-38, wherein the network node is further configured to perform one or more actions in response to the received failure indication message.

40. The network node of statement 39, wherein the one or more actions comprise any of:
   adding one or more identifiers for network nodes operating according to the second RAT to the mobility set in the terminal device;
   removing one or more identifiers for network nodes operating according to the second RAT from the mobility set in the terminal device;
   configuring the terminal device to stop attempting to perform access network selection, traffic steering and/or traffic aggregation;
   collecting statistics on the performance of the second network (i.e. a network operating according to the second RAT);
   reconfiguring one or more network nodes operating according to the second RAT.

41. The network node of any of statements 35-40, wherein a failure indication message is received for each failure condition that occurs.

42. The network node of any of statements 35-41, wherein the failure indication message indicates the network node or network nodes operating according to the second RAT having an identifier in the mobility set for which the failure condition occurred.

43. The network node of any of statements 35-41, wherein the failure indication message indicates the identifiers in the mobility set associated with the network node or network nodes operating according to the second RAT for which the failure condition occurred.

44. The network node of statement 42 or 43, wherein the failure indication message also indicates one or more additional identifiers that are associated with the network node or network nodes operating according to the second RAT for which the failure condition occurred, wherein the one or more additional identifiers are not contained in the mobility set.

45. The network node of any of statements 35-44, wherein the failure indication message is received from the terminal device as part of a radio resource control, RRC, message.

46. The network node of any of statements 35-44, wherein the failure indication message is received from the terminal device as part of a secondary cell group, SCG, failure information message.

47. A computer program product comprising a computer readable medium having computer readable code embodied therein, the computer readable code being configured such that, on execution by a suitable computer or processor, the computer or processor is caused to perform any of the methods in statements 1-11 or 23-34.

48. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises a processor and a memory, said memory containing instructions executable by said processor whereby said terminal device is operative to:
- on occurrence of a failure condition with respect to a connection to one or more network nodes operating according to the second RAT having an identifier in the mobility set, send a failure indication message to the first network to signal the occurrence of the failure condition to the first network;
- wherein the failure condition comprises:
  - the terminal device failing to connect to all of the network nodes operating according to the second RAT that have an identifier in the mobility set;
  - the terminal device failing to detect all of the network nodes operating according to the second RAT that have an identifier in the mobility set; or
  - the terminal device failing to connect to all of the network nodes operating according to the second RAT that have an identifier in the mobility set and that have been detected by the terminal device.

49. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises a processor and a memory, said memory containing instructions executable by said processor whereby said terminal device is operative to:
- on occurrence of a failure condition with respect to a connection to one or more network nodes operating according to the second RAT having an identifier in the mobility set, send a failure indication message to the first network to signal the occurrence of the failure condition to the first network;
- wherein the failure condition comprises:
  - the terminal device failing to connect to all of the network nodes operating according to the second RAT that have an identifier in the mobility set during a predetermined time period;
  - the terminal device failing to detect all of the network nodes operating according to the second RAT that have an identifier in the mobility set during a predetermined time period; or
  - the terminal device failing to connect to all of the network nodes operating according to the second RAT that have an identifier in the mobility set and that have been detected by the terminal device during a predetermined time period.

50. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises a processor and a memory, said memory containing instructions executable by said processor whereby said terminal device is operative to:
- on occurrence of a failure condition with respect to a connection to one or more network nodes operating according to the second RAT having an identifier in the mobility set, send a failure indication message to the first network to signal the occurrence of the failure condition to the first network
- wherein the failure condition comprises:
  - a user preference indicating that the terminal device is not to connect to any network nodes operating according to the second RAT having an identifier in the mobility set; or
  - communication circuitry in the terminal device for use in communicating with network nodes operating according to the second RAT being deactivated or disabled.

51. The terminal device of any of statements 48-50, wherein the terminal device is further operative to:
- receive the mobility set from the first network or a network node operating according to the second RAT.

52. The terminal device of any of statements 48-50, wherein the terminal device is further operative to:
- obtain the mobility set from an access network discovery and selection function, ANDSF, policy.

53. The terminal device of any of statements 48-52, wherein a failure indication message is sent for each failure condition that occurs.

54. The terminal device of any of statements 48-53, wherein the failure indication message indicates the network node or network nodes operating according to the second RAT having an identifier in the mobility set for which the failure condition occurred.

55. The terminal device of any of statements 48-53, wherein the failure indication message indicates the identifiers in the mobility set associated with the network node or network nodes operating according to the second RAT for which the failure condition occurred.

56. The terminal device of statement 54 or 55, wherein the failure indication message also indicates one or more additional identifiers that are associated with the network node or network nodes operating according to the second RAT for which the failure condition occurred, wherein the one or more additional identifiers are not contained in the mobility set.

57. The terminal device of any of statements 48-56, wherein the failure indication message is sent to the first network as part of a radio resource control, RRC, message.

58. The terminal device of any of statements 48-56, wherein the failure indication message is sent to the first network as part of a secondary cell group, SCG, failure information message.

59. A network node for use in a first network that is operating according to a first radio access technology, RAT, wherein the network node comprises a processor and a memory, said memory containing instructions executable by said processor whereby said network node is operative to:
- receive a failure indication message from a terminal device, the failure indication message indicating the occurrence of a failure condition with respect to a connection to one or more network nodes operating according to a second RAT and that have an identifier in a mobility set in the terminal device;
- wherein the failure condition comprises:
  - the terminal device failing to connect to all of the network nodes operating according to the second RAT that have an identifier in the mobility set;
  - the terminal device failing to detect all of the network nodes operating according to the second RAT that have an identifier in the mobility set; or
  - the terminal device failing to connect to all of the network nodes operating according to the second RAT that have an identifier in the mobility set and that have been detected by the terminal device.

60. A network node for use in a first network that is operating according to a first radio access technology, RAT, wherein the network node comprises a processor and a memory, said memory containing instructions executable by said processor whereby said network node is operative to:
- receive a failure indication message from a terminal device, the failure indication message indicating the occurrence of a failure condition with respect to a connection to one or more network nodes operating according to a second RAT and that have an identifier in a mobility set in the terminal device;
- wherein the failure condition comprises:
  - the terminal device failing to connect to all of the network nodes operating according to the second RAT that have an identifier in the mobility set during a predetermined time period;
  - the terminal device failing to detect all of the network nodes operating according to the second RAT that have an identifier in the mobility set during a predetermined time period; or
  - the terminal device failing to connect to all of the network nodes operating according to the second RAT that have an identifier in the mobility set and that have been detected by the terminal device during a predetermined time period.

61. A network node for use in a first network that is operating according to a first radio access technology, RAT, wherein the network node comprises a processor and a memory, said memory containing instructions executable by said processor whereby said network node is operative to:
- receive a failure indication message from a terminal device, the failure indication message indicating the occurrence of a failure condition with respect to a connection to one or more network nodes operating according to a second RAT and that have an identifier in a mobility set in the terminal device;
- wherein the failure condition comprises:
  - a user preference indicating that the terminal device is not to connect to any network nodes operating according to the second RAT having an identifier in the mobility set; or
  - communication circuitry in the terminal device for use in communicating with network nodes operating according to the second RAT being deactivated or disabled.

62. The network node of any of statements 59-61, wherein the network node is further configured to send the mobility set to the terminal device.

63. The network node of any of statements 59-62, wherein the network node is further configured to perform one or more actions in response to the received failure indication message.

64. The network node of statement 63, wherein the one or more actions comprise any of:
- adding one or more identifiers for network nodes operating according to the second RAT to the mobility set in the terminal device;
- removing one or more identifiers for network nodes operating according to the second RAT from the mobility set in the terminal device;
- configuring the terminal device to stop attempting to perform access network selection, traffic steering and/or traffic aggregation;
- collecting statistics on the performance of the second network (i.e. a network operating according to the second RAT);
- reconfiguring one or more network nodes operating according to the second RAT.

65. The network node of any of statements 59-64, wherein a failure indication message is received for each failure condition that occurs.

66. The network node of any of statements 59-65, wherein the failure indication message indicates the network node or network nodes operating according to the second RAT having an identifier in the mobility set for which the failure condition occurred.

67. The network node of any of statements 59-65, wherein the failure indication message indicates the identifiers in the mobility set associated with the network node or network nodes operating according to the second RAT for which the failure condition occurred.

68. The network node of statement 66 or 67, wherein the failure indication message also indicates one or more additional identifiers that are associated with the network node or network nodes operating according to the second RAT for which the failure condition occurred, wherein the one or more additional identifiers are not contained in the mobility set.

69. The network node of any of statements 59-68, wherein the failure indication message is received from the terminal device as part of a radio resource control, RRC, message.

70. The network node of any of statements 59-68, wherein the failure indication message is received from the terminal device as part of a secondary cell group, SCG, failure information message.

71. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises:
- a sending module configured to, on occurrence of a failure condition with respect to a connection to one or more network nodes operating according to the second RAT having an identifier in the mobility set, send a failure indication message to the first network to signal the occurrence of the failure condition to the first network;
- wherein the failure condition comprises:
  - the terminal device failing to connect to all of the network nodes operating according to the second RAT that have an identifier in the mobility set;
  - the terminal device failing to detect all of the network nodes operating according to the second RAT that have an identifier in the mobility set; or
  - the terminal device failing to connect to all of the network nodes operating according to the second RAT that have an identifier in the mobility set and that have been detected by the terminal device.

72. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises:
- a sending module configured to, on occurrence of a failure condition with respect to a connection to one or more network nodes operating according to the second RAT having an identifier in the mobility set, send a failure indication message to the first network to signal the occurrence of the failure condition to the first network;

wherein the failure condition comprises:
the terminal device failing to connect to all of the network nodes operating according to the second RAT that have an identifier in the mobility set during a predetermined time period;
the terminal device failing to detect all of the network nodes operating according to the second RAT that have an identifier in the mobility set during a predetermined time period; or
the terminal device failing to connect to all of the network nodes operating according to the second RAT that have an identifier in the mobility set and that have been detected by the terminal device during a predetermined time period.

73. A terminal device for use with a first network operating according to a first radio access technology, RAT, and network nodes operating according to a second RAT, wherein the terminal device has a mobility set comprising identifiers for one or more network nodes operating according to the second RAT that can be used for access network selection, traffic steering and/or traffic aggregation, wherein the terminal device comprises:
a sending module configured to, on occurrence of a failure condition with respect to a connection to one or more network nodes operating according to the second RAT having an identifier in the mobility set, send a failure indication message to the first network to signal the occurrence of the failure condition to the first network
wherein the failure condition comprises:
a user preference indicating that the terminal device is not to connect to any network nodes operating according to the second RAT having an identifier in the mobility set; or
communication circuitry in the terminal device for use in communicating with network nodes operating according to the second RAT being deactivated or disabled.

74. A network node for use in a first network that is operating according to a first radio access technology, RAT, wherein the network node comprises:
a receiving module configured to receive a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
the terminal device failing to connect to all of the network nodes operating according to the second RAT that have an identifier in the mobility set;
the terminal device failing to detect all of the network nodes operating according to the second RAT that have an identifier in the mobility set; or
the terminal device failing to connect to all of the network nodes operating according to the second RAT that have an identifier in the mobility set and that have been detected by the terminal device.

75. A network node for use in a first network that is operating according to a first radio access technology, RAT, wherein the network node comprises:
a receiving module configured to receive a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
the terminal device failing to connect to all of the network nodes operating according to the second RAT that have an identifier in the mobility set during a predetermined time period;
the terminal device failing to detect all of the network nodes operating according to the second RAT that have an identifier in the mobility set during a predetermined time period; or
the terminal device failing to connect to all of the network nodes operating according to the second RAT that have an identifier in the mobility set and that have been detected by the terminal device during a predetermined time period.

76. A network node for use in a first network that is operating according to a first radio access technology, RAT, wherein the network node comprises:
a receiving module configured to receive a failure indication message from a terminal device, the failure indication message indicating the occurrence of a failure condition with respect to a connection to one or more network nodes operating according to a second RAT and that have an identifier in a mobility set in the terminal device;
wherein the failure condition comprises:
a user preference indicating that the terminal device is not to connect to any network nodes operating according to the second RAT having an identifier in the mobility set; or
communication circuitry in the terminal device for use in communicating with network nodes operating according to the second RAT being deactivated or disabled.

The invention claimed is:
1. A method of operating a terminal device, the terminal device being configured to communicate with a first network operating according to a first radio access technology, RAT, and network nodes operating according to a second RAT, the terminal device having a mobility set comprising identifiers for a plurality of network nodes operating according to the second RAT that can be used for at least one selected from the group consisting of access network selection, traffic steering and traffic aggregation, the method comprising:
on occurrence of a failure condition with respect to connections to all network nodes operating according to the second RAT that have an identifier in the mobility set, sending a failure indication message to the first network to signal the occurrence of the failure condition to the first network; and
the failure condition comprising one of:
the terminal device failing to connect to all of the network nodes operating according to the second RAT that have an identifier in the mobility set;
the terminal device failing to detect all of the network nodes operating according to the second RAT that have an identifier in the mobility set; and
the terminal device failing to connect to all of the network nodes operating according to the second RAT that have an identifier in the mobility set and that have been detected by the terminal device.

2. The method of claim 1, wherein the method further comprises the step of:

receiving the mobility set from one of the first network and a network node operating according to the second RAT.

3. The method of claim 1, wherein the method further comprises the step of:
obtaining the mobility set from an access network discovery and selection function, ANDSF, policy.

4. The method of claim 1, wherein the failure indication message indicates the at least one network node operating according to the second RAT having an identifier in the mobility set for which the failure condition occurred.

5. The method of claim 1, wherein the failure indication message indicates the identifiers in the mobility set associated with the at least one network node operating according to the second RAT for which the failure condition occurred.

6. The method of claim 4, wherein the failure indication message also indicates at least one additional identifier that is associated with the at least one network node operating according to the second RAT for which the failure condition occurred, wherein the at least one additional identifier is not contained in the mobility set.

7. The method of claim 1, wherein the failure indication message is sent to the first network as part of a secondary cell group, SCG, failure information message.

8. A method of operating a network node in a first network that is operating according to a first radio access technology, RAT, in which the method comprises:
receiving a failure indication message from a terminal device, the failure indication message indicating the occurrence of a failure condition with respect to connections to all of a plurality of network nodes operating according to a second RAT that have an identifier in a mobility set in the terminal device;
the failure condition comprising one of:
the terminal device failing to connect to all of the network nodes operating according to the second RAT that have an identifier in the mobility set;
the terminal device failing to detect all of the network nodes operating according to the second RAT that have an identifier in the mobility set;
the terminal device failing to connect to all of the network nodes operating according to the second RAT that have an identifier in the mobility set and that have been detected by the terminal device; and
sending the mobility set to the terminal device.

9. The method of claim 8, wherein the method further comprises the step of:
performing at least one action in response to the received failure indication message.

10. The method of claim 9, wherein the at least one action comprises any of:
adding at least one identifier for network nodes operating according to the second RAT to the mobility set in the terminal device;
removing at least one identifier for network nodes operating according to the second RAT from the mobility set in the terminal device;
configuring the terminal device to stop attempting to perform at least one selected from the group consisting of access network selection, traffic steering and traffic aggregation;
collecting statistics on the performance of at least one network node operating according to the second RAT; and
reconfiguring least one network node operating according to the second RAT.

11. A terminal device for use with a first network operating according to a first radio access technology, RAT, and network nodes operating according to a second RAT, the terminal device having a mobility set comprising identifiers for a plurality of network nodes operating according to the second RAT that can be used for at least one selected from the group consisting of access network selection, traffic steering and traffic aggregation, the terminal device comprising a processor and a memory, the memory containing instructions executable by the processor whereby the terminal device is configured to:
on occurrence of a failure condition with respect to connections to all network nodes operating according to the second RAT that have an identifier in the mobility set, send a failure indication message to the first network to signal the occurrence of the failure condition to the first network; and
the failure condition comprising one of:
the terminal device failing to connect to all of the network nodes operating according to the second RAT that have an identifier in the mobility set;
the terminal device failing to detect all of the network nodes operating according to the second RAT that have an identifier in the mobility set; and
the terminal device failing to connect to all of the network nodes operating according to the second RAT that have an identifier in the mobility set and that have been detected by the terminal device.

12. The terminal device of claim 11, wherein the terminal device is further configured to:
receive the mobility set from one of the first network and a network node operating according to the second RAT.

13. The terminal device of claim 11, wherein the terminal device is further configured to:
obtain the mobility set from an access network discovery and selection function, ANDSF, policy.

14. The terminal device of claim 11, wherein the failure indication message indicates the at least one network node operating according to the second RAT having an identifier in the mobility set for which the failure condition occurred.

15. The terminal device of claim 11, wherein the failure indication message indicates the identifiers in the mobility set associated with the at least one network node operating according to the second RAT for which the failure condition occurred.

16. The terminal device of claim 14, wherein the failure indication message also indicates at least one additional identifier that is associated with the at least one network node operating according to the second RAT for which the failure condition occurred, wherein the at least one additional identifier is not contained in the mobility set.

17. The terminal device of claim 11, wherein the failure indication message is sent to the first network as part of a secondary cell group, SCG, failure information message.

18. A network node for use in a first network that is operating according to a first radio access technology, RAT, the network node comprising a processor and a memory, the memory containing instructions executable by the processor to cause the network node to:
receive a failure indication message from a terminal device, the failure indication message indicating the occurrence of a failure condition with respect to connections to all of a plurality of network nodes operating according to a second RAT that have an identifier in a mobility set in the terminal device;

the failure condition comprising one of:
- the terminal device failing to connect to all of the network nodes operating according to the second RAT that have an identifier in the mobility set;
- the terminal device failing to detect all of the network nodes operating according to the second RAT that have an identifier in the mobility set; and
- the terminal device failing to connect to all of the network nodes operating according to the second RAT that have an identifier in the mobility set and that have been detected by the terminal device; and send the mobility set to the terminal device.

19. The network node of claim 18, wherein the network node is further configured to perform at least one action in response to the received failure indication message.

20. The network node of claim 19, wherein the at least one action comprise any of:
- adding at least one identifier for network nodes operating according to the second RAT to the mobility set in the terminal device;
- removing at least one identifier for network nodes operating according to the second RAT from the mobility set in the terminal device;
- configuring the terminal device to stop attempting to perform at least one selected from the group consisting of access network selection, traffic steering and traffic aggregation;
- collecting statistics on the performance of a network operating according to the second RAT;
- reconfiguring at least one network node operating according to the second RAT.

* * * * *